(12) United States Patent
Ukuda

(10) Patent No.: US 6,912,092 B2
(45) Date of Patent: Jun. 28, 2005

(54) OPTICAL MATERIAL, AND, OPTICAL ELEMENT, OPTICAL SYSTEM AND LAMINATED DIFFRACTIVE OPTICAL ELEMENT USING IT

(75) Inventor: Hideo Ukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/647,275

(22) Filed: Aug. 26, 2003

(65) Prior Publication Data

US 2004/0051949 A1 Mar. 18, 2004

(30) Foreign Application Priority Data

Aug. 30, 2002 (JP) .......................... 2002-254711
Jul. 10, 2003 (JP) .......................... 2003-194939

(51) Int. Cl.$^7$ .................. G02B 11/00; G02B 13/00; G02B 15/00; G02B 17/00; G02B 25/00
(52) U.S. Cl. .................. 359/642; 359/558; 359/576
(58) Field of Search .................. 359/558, 563–566, 359/569–574, 576, 741–742, 719, 708; 378/70, 82

(56) References Cited

U.S. PATENT DOCUMENTS

| | | | | |
|---|---|---|---|---|
| 6,061,110 A | * | 5/2000 | Hisatake et al. | ............ 349/113 |
| 6,157,488 A | | 12/2000 | Ishii | ............ 359/569 |
| 6,188,522 B1 | * | 2/2001 | Kimura et al. | ............ 359/649 |
| 6,262,846 B1 | | 7/2001 | Nakai | ............ 359/576 |
| 6,381,079 B1 | * | 4/2002 | Ogawa | ............ 359/795 |
| 6,480,332 B1 | | 11/2002 | Nakai | ............ 359/566 |
| 2003/0231396 A1 | * | 12/2003 | Nakai | ............ 359/569 |

FOREIGN PATENT DOCUMENTS

| | | |
|---|---|---|
| EP | 1 065 531 A2 | 1/2001 |
| JP | 9-127321 | 5/1997 |
| JP | 9-127322 | 5/1997 |
| JP | 11-44808 | 2/1999 |
| JP | 11-44810 | 2/1999 |

OTHER PUBLICATIONS

Michael W. Farn et al., "Diffractive Doublet Corrected On–Axis at Two Wavelengths," 1354 *SPIE* 24–29(1990).
Carmiña Londoño et al., "The Design of Achromated Hybrid Diffractive Lens Systems," 1354 *SPIE* 30–37 (1990).
Ivan D. Nikolov et al., "Optical Plastic Refractive Measurements in the Visible and Near–Infrared Regions," 39(13) *Applied Optics* 2067–70 (May 2000).

* cited by examiner

*Primary Examiner*—Jordan M. Schwartz
*Assistant Examiner*—Jessica Stultz
(74) *Attorney, Agent, or Firm*—Fitzpatrick, Cella, Harper & Scinto

(57) ABSTRACT

An optical element of which diffraction efficiency hardly varies with wavelength is provided by using an optical material satisfying the conditions that $n_d > -6.667 \times 10^{-3} v^d + 1.70$ and $\theta_{g,F} \leq -2 \times 10^{-3} v_d + 0.59$ where $n_d$ is a refractive index at d-line, $v_d$ is an Abbe number at the d-line, and $\theta_{g,F}$ is a second order dispersion at d-line, whereby diffraction efficiency is improved in any working visible wavelength region and more precise chromatic aberration correction is obtained.

12 Claims, 21 Drawing Sheets

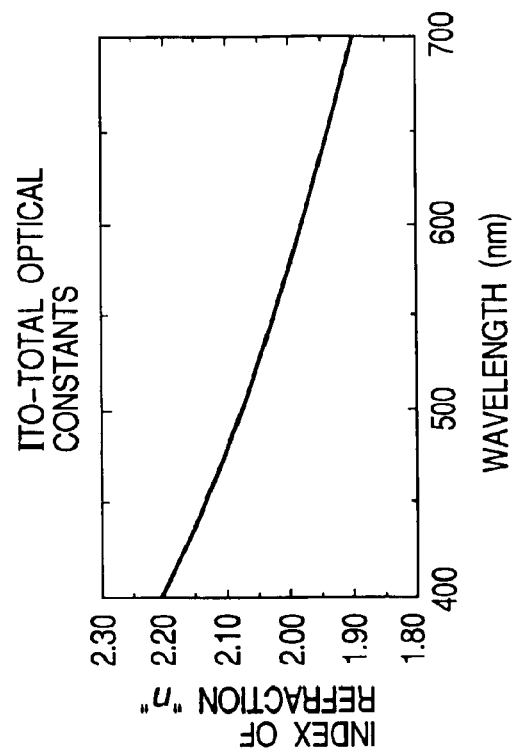
FIG. 4A
FIG. 4B
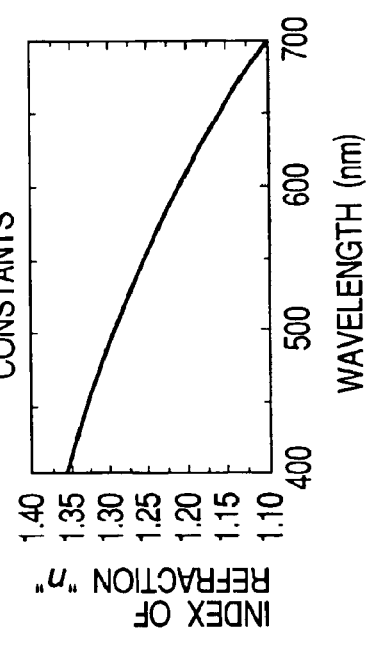
FIG. 4C

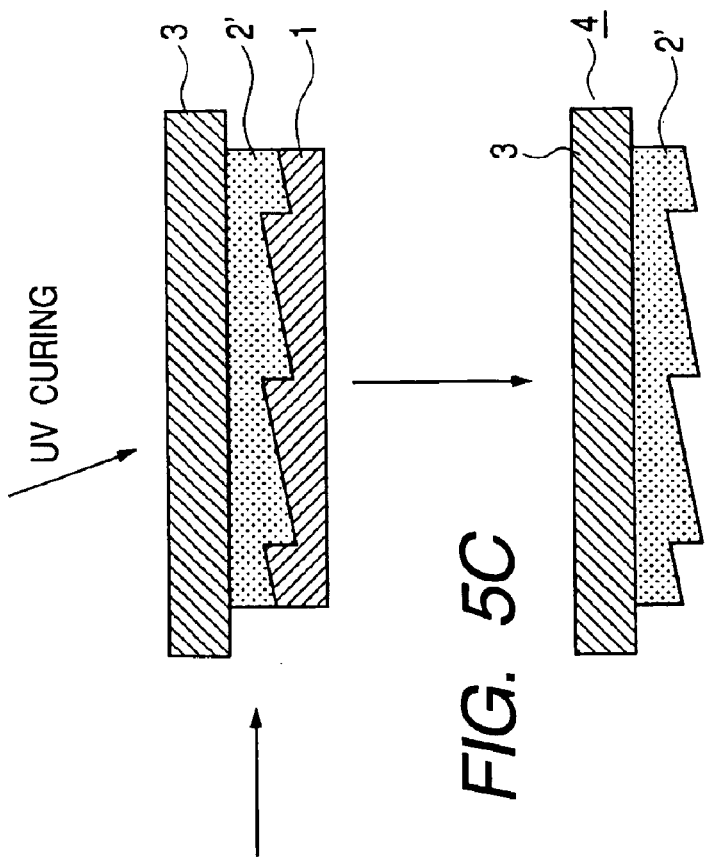
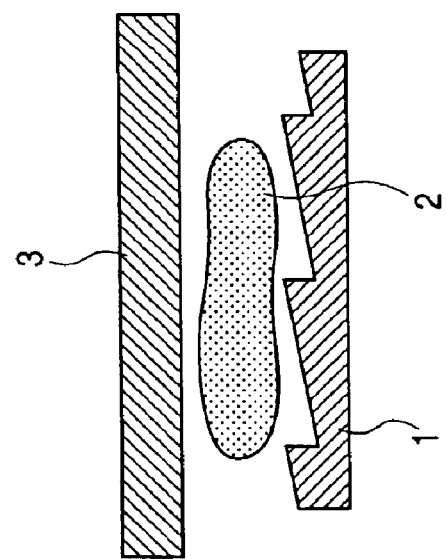
FIG. 5A
FIG. 5B
FIG. 5C

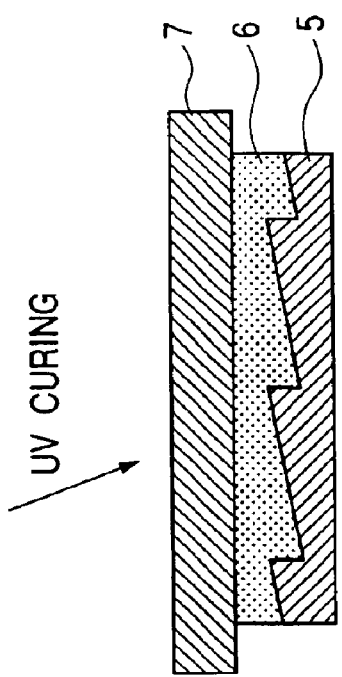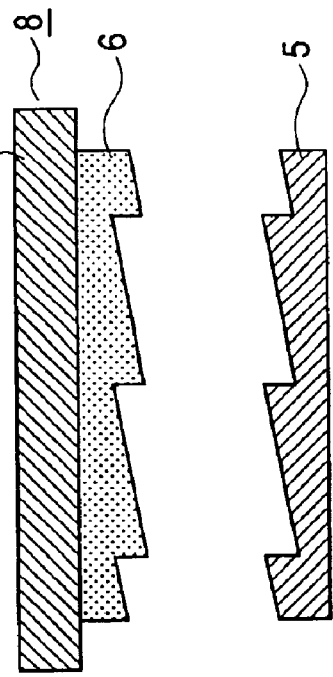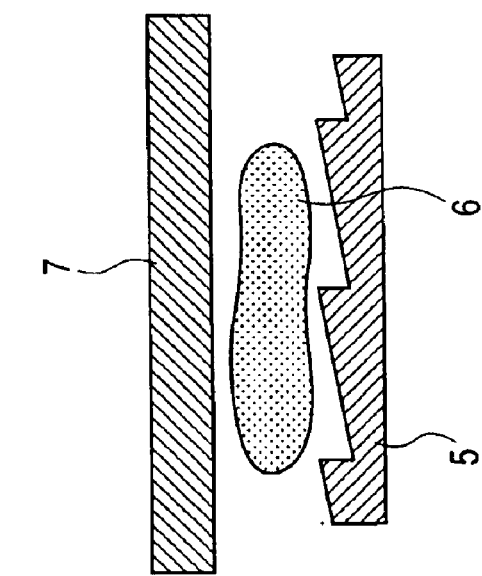

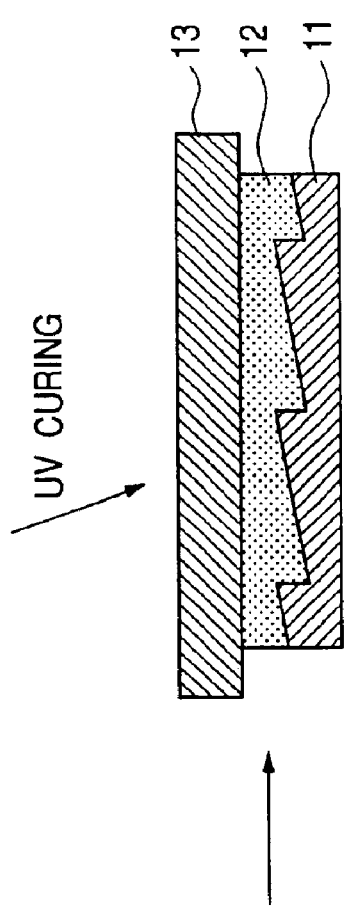
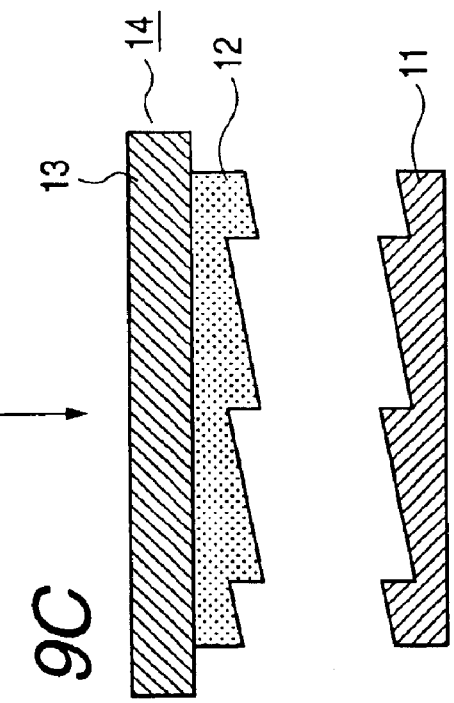
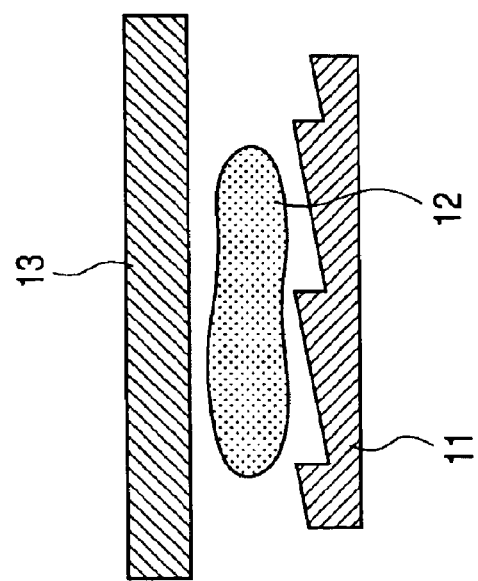
FIG. 9A
FIG. 9B
FIG. 9C

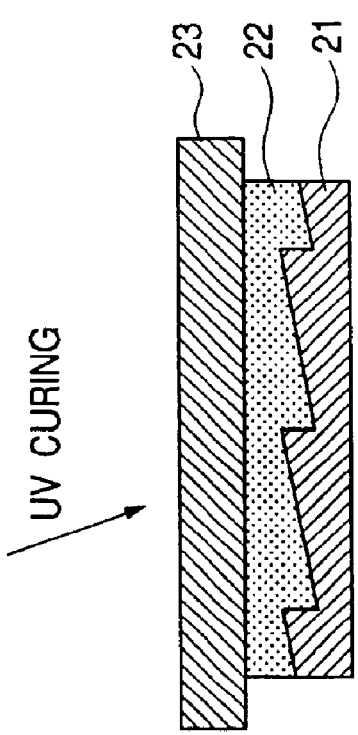
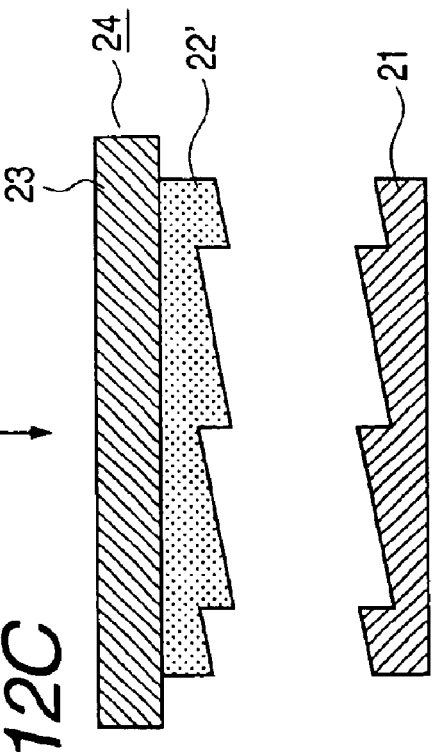
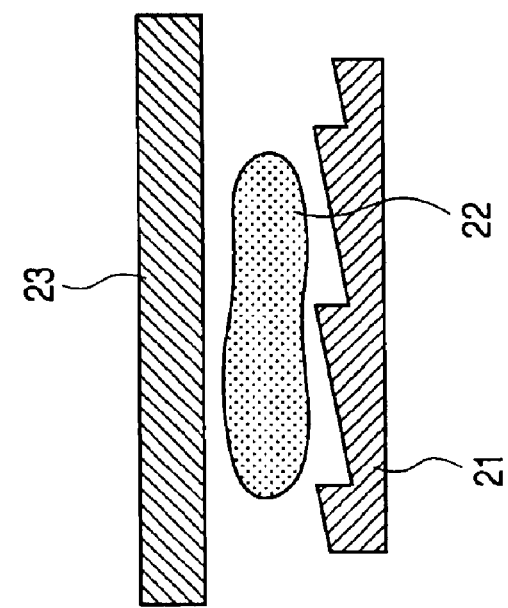

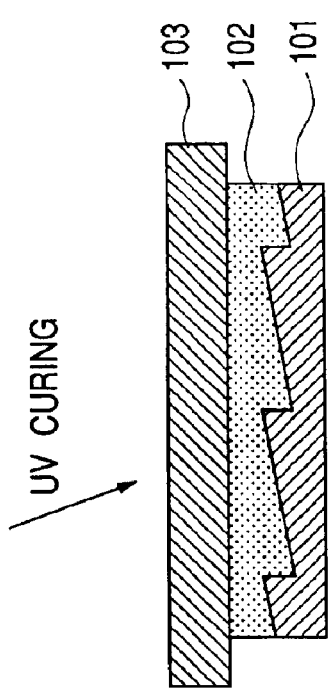
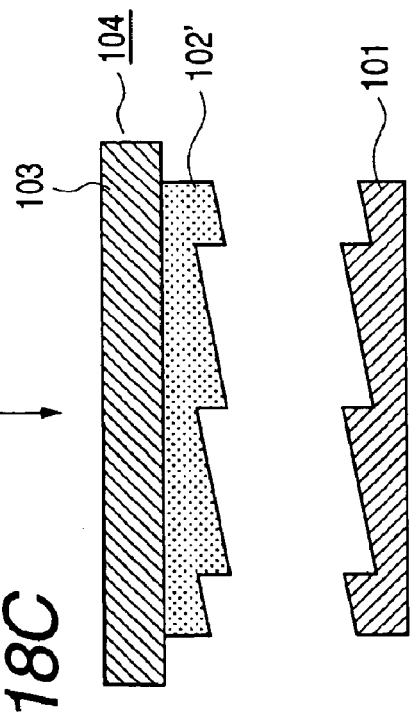
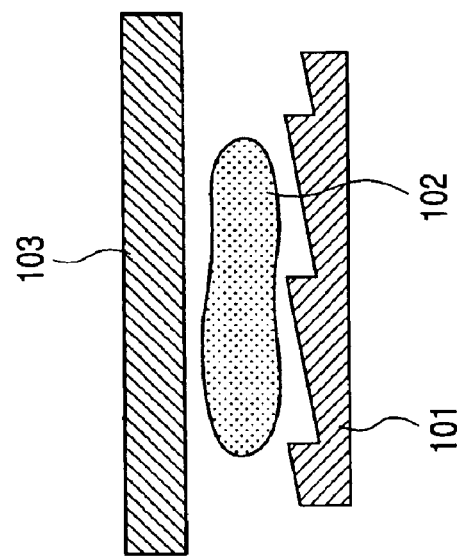

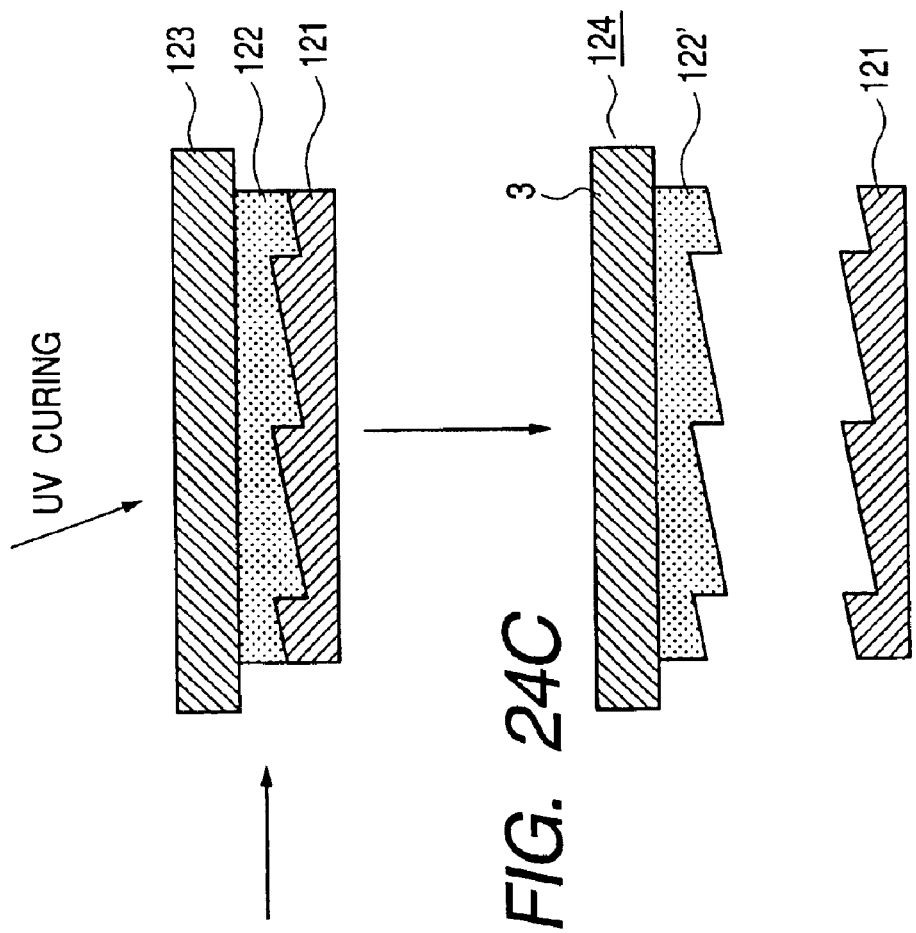
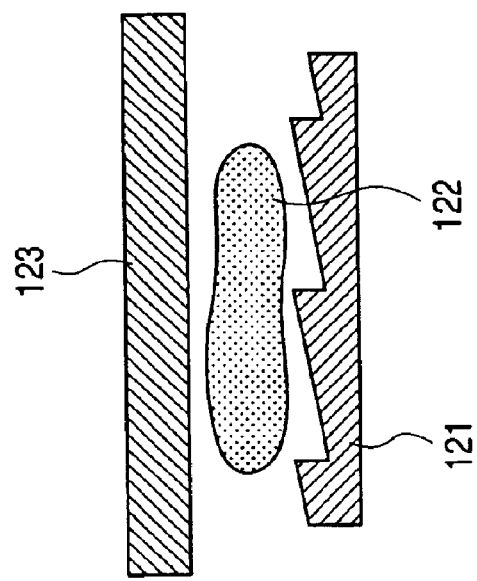

OPTICAL MATERIAL, AND, OPTICAL ELEMENT, OPTICAL SYSTEM AND LAMINATED DIFFRACTIVE OPTICAL ELEMENT USING IT

BACKGROUND OF THE INVENTION

1. Field of the Invention

The present invention relates to an optical material for optical elements such as refractive optical elements and diffractive optical elements. More specifically, the present invention relates to an optical material with high dispersion (wide variation of refractive index with wavelength), and optical elements, diffractive optical elements and laminated diffractive optical elements molded therefrom.

2. Related Background Art

In conventional refractive optical systems based on solely light refraction, chromatic aberration has been reduced by combination of glass materials different in dispersion characteristics. For example, in a telescope, the chromatic aberration of the object lens is corrected by combining a positive lens made of a low-dispersion glass material and a negative lens made of a high-dispersion glass material. Thus, it is difficult to obtain sufficient correction of chromatic aberration when there is limitation in the configuration and number of available lenses or in available glass materials.

SPIE Vol. 1354 (International Lens Design Conference (1990)) discloses a method for reducing color aberration by using a diffractive optical element provided with a diffraction grating on the lens surface or as part of the optical system. This method utilizes a physical phenomenon that the chromatic aberration to light of a reference wavelength occurs in the opposite direction between a refracting surface and a diffracting surface of optical elements. Furthermore, by changing the period of the periodic structure of the diffraction grating, such a diffractive optical element can achieve the same effect as an aspherical lens. Accordingly, such diffractive optical elements are very effective to reduce chromatic aberration.

Here the diffraction effect of light is explained. In general, when a light beam enters into a spherical lens or an aspherical lens, i.e., an refraction based optical element, it comes out as a light beam even after refraction. On the other hand, a diffractive optical element splits the incident beam into plurality beams of respective orders by diffraction.

Accordingly, for full exertion of the optical feature of a diffractive optical element in an optical system, it is necessary to concentrate the light beam in a working wavelength region in a particular order (hereinafter it may be called "design order"). When the light beam of the working wavelength is concentrated in a particular design order, the intensity of the diffracted light in the other diffraction orders becomes so weak that light beams in the other orders will not give images (flare light) other than the image of the light beam in the design order.

JP09-127321A, JP09-127322A, JP11-044808A and JP11-044810A disclose structures where grating structure is determined so as to concentrate the light beam in the working wavelength region in a design order in order to obtain sufficiently high diffraction efficiency. These structures are constructed by combining a plurality of optical elements, in such a manner that diffraction efficiency becomes high over a wide wavelength range, choosing optimally dispersion of each optical element and the grating shape formed in the boundary region between the optical elements. Specifically, a desired diffractive optical element is formed so that a plurality of optical elements are laminated on a substrate, and at least one of interfaces is provided with a relief pattern, a staircase pattern, a kinoform or the like.

In these prior arts, to obtain a structure of high diffraction efficiency over a wide wavelength range, two materials are used in combination, those having relatively low and high dispersion respectively. Specifically, in JP09-127321A, BMS81 ($n_d$=1.64, $v_d$=60.1: from Ohara Inc.) is used as a material of low dispersion and a plastic optical material PC ($n_d$=1.58, $v_d$=30.5: from Teijin Chemicals Ltd.) is used as a material of high dispersion. Similarly, in JP09-127322A, LaL14 ($n_d$=1.698, $v_d$=55.5: from Ohara Inc.), acrylic resin ($n_d$=1.49, $v_d$=57.7), Cytop ($n_d$=1.34149, $v_d$=93.8: from Asahi Glass Co., Ltd.) are used as a material low in dispersion, and a plastic optical material PC ($n_d$=1.58, $v_d$=30.5: from Teijin Chemicals Ltd.) as a material high in dispersion. In JP11-044808A and JP11-044810A, C001 ($n_d$=1.525, $v_d$=50.8: from Dai-Nippon Ink and Chemical Industry Co., Ltd.) and PMMA ($n_d$=1.4917, $v_d$=57.4), and BMS81 ($n_d$=1.64, $v_d$=60.1: from Ohara Inc.) are used as a material of low dispersion, and a plastic optical material PC ($n_d$=1.58, $v_d$=30.5: from Teijin Chemicals Ltd.) and PS ($n_d$=1.5918, $v_d$=31.1) and the like are used as a material of high dispersion.

The larger is the difference in dispersion between these materials, the higher is the diffraction efficiency and the wider is the field angle of the optical element made thereof. For that purpose, it is necessary to use a material higher in dispersion (smaller in Abbe number); the use of such a material permits precise correction of chromatic aberration.

FIG. 1 is a graph showing the Abbe numbers and refractive indexes of commercially available optical materials. In FIG. 1, the ordinate axis represents the refractive index ($n_d$) and the abscissa axis represents Abbe number ($v_d$). FIG. 1 includes the optical materials described in the above-mentioned JP09-127321A, JP09-127322A, JP11-044808A and JP11-044810A. As can be see from FIG. 1, the refractive indexes of general optical materials satisfy the condition that $n_d > -6.667 \times 10^{-3} v_d + 1.70$. Incidentally, the straight line shown in FIG. 1 represents the expression that $n_d = -6.667 \times 10^{-3} v_d + 1.70$. Among the organic polymer optical materials shown in FIG. 1, polyvinylcarbazole (PVCZ) has the smallest Abbe number of 17.3.

However, the mere use of a material high in dispersion (small in Abbe number) is not sufficient for further function improvement of a diffractive optical element because there occurs some partial reduction of the diffraction efficiency in the working wavelength region even if the overall diffraction efficiency in the whole visible region is increased. FIG. 2 is a graph showing the diffraction efficiency of a multilayer diffractive optical element for which polyvinylcarbazole is utilized as the material high in dispersion. In FIG. 2, the ordinate and abscissa axes represent the diffraction efficiency and wavelength, respectively. As FIG. 2 shows, in the working wavelength region (from 400 nm to 700 nm), the diffraction efficiency is as low as in the order of 95% in the regions of 400 to 420 nm and of 630 to 700 nm; particularly, the diffraction efficiency is low in the shorter wavelength region. Accordingly, further improvement is needed.

SUMMARY OF THE INVENTION

The present invention provides an optical material and an optical element having improved diffraction efficiency over the entire visible region without reduction of diffraction efficiency in certain wavelength regions, taking into consideration not only high dispersion (small Abbe number) but also the relationships between refractive index ($n_d$) and Abbe number ($v_d$), and between Abbe number ($v_d$) and second order dispersion ($\theta_{g,F}$).

To solve the above-mentioned problems, the present invention provides an optical material that satisfies the following relations:

$$n_d > -6.667 \times 10^{-3} v_d + 1.70, \text{ and}$$

$$\theta_{g,F} \leq -2 \times 10^{-3} v_d + 0.59$$

where $N_d$ is refractive index at d-line, and $v_d$ is Abbe number, and $\theta_{g,F}$ is second order dispersion.

Further, according to one embodiment of the present invention, Abbe number ($v_d$) of the optical material is 30 or less.

Furthermore, according to one embodiment of the present invention, the optical material is made of ITO.

Further, according to one embodiment of the present invention, the optical material contains inorganic nanoparticles of which second order dispersion ($\theta_{g,F}$) is 0.45 or less.

Further, according to one embodiment of the present invention, the optical material contains polystyrene and ITO nanoparticles.

Still further, according to one embodiment of the present invention, the particle size of the above described ITO nanoparticles is from 2 to 50 nm.

Still further, the present invention provides an optical element which is manufactured from the above-described optical material.

Still further, the present invention provides a diffractive optical element and a refractive optical element each having a diffracting surface and a refracting surface respectively.

Another aspect of the present invention provides a laminated-type diffractive optical element which is constructed by combining the above described diffractive optical element with another diffractive optical element having optical characteristics different from those of the above described diffractive optical element in such a way that the diffracting surfaces thereof are opposite to each other.

Still another aspect of the present invention provides a projection optical system and an imaging optical system in each of which the above described optical element is incorporated.

The above and other objects of the present invention will become more apparent from the following drawings taken in conjunction with the accompanying drawings.

BRIEF DESCRIPTION OF THE DRAWINGS

FIGS. 4A, 4B and 4C are graphs showing refractive index of ITO in the visible region;

FIGS. 5A, 5B and 5C are schematic sectional views showing the processes for forming an optical element in Example 1;

FIGS. 6A, 6B and 6C are sets of schematic sectional views showing the processes for forming an optical element in Example 1;

FIGS. 9A, 9B and 9C are schematic sectional views showing the process for forming an optical element in Example 2;

FIGS. 12A, 12B and 12C are schematic sectional views showing the process for forming an optical element in Example 3;

FIGS. 18A, 18B and 18C are schematic sectional views showing the process for forming an optical element in Comparative Example 1;

FIGS. 24A, 24B and 24C are schematic sectional views showing the process for forming an optical element in Comparative Example 3;

DETAILED DESCRIPTION OF THE PREFERRED EMBODIMENTS

First Aspect

Usually, the light refractive index of an optical element changes sharply as the wavelength becomes short, deviating from the designed refractive index. Accordingly, the shorter the wavelength becomes, the greater is decrease in diffraction efficiency in the design order. The present inventor has found that such sharp change in the wavelength dispersion of a material is caused by the second order dispersion of the refractive index, $\theta_{g,F}=(n_g-n_F)/(n_F-n_c)$, and the diffraction efficiency increases as the second order dispersion $\theta_{g,F}$ decreases.

Figure 1:
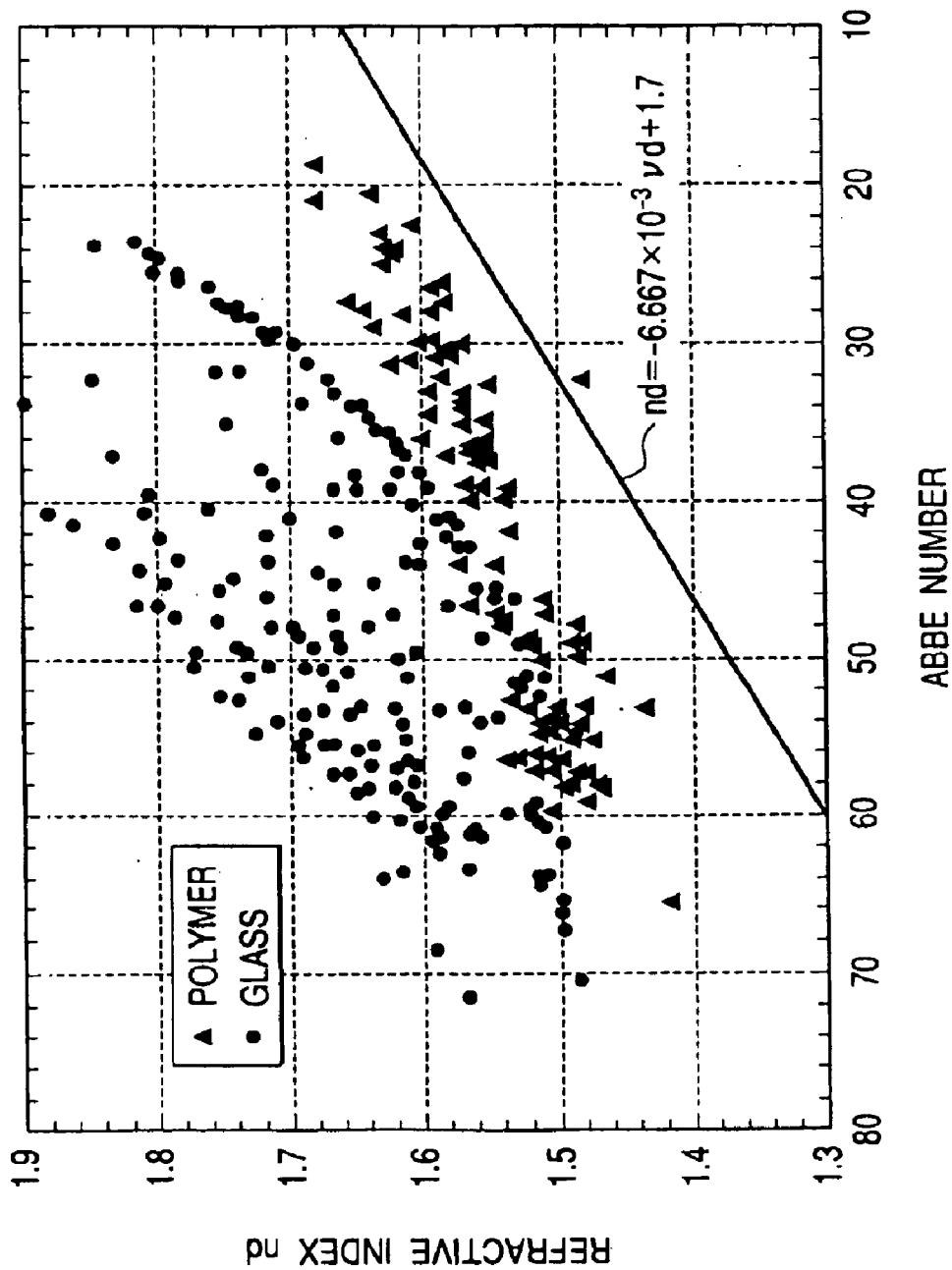
FIG. 1 is a graph showing distribution of refractive index and Abbe number of ordinary optical materials.
Figure 2:
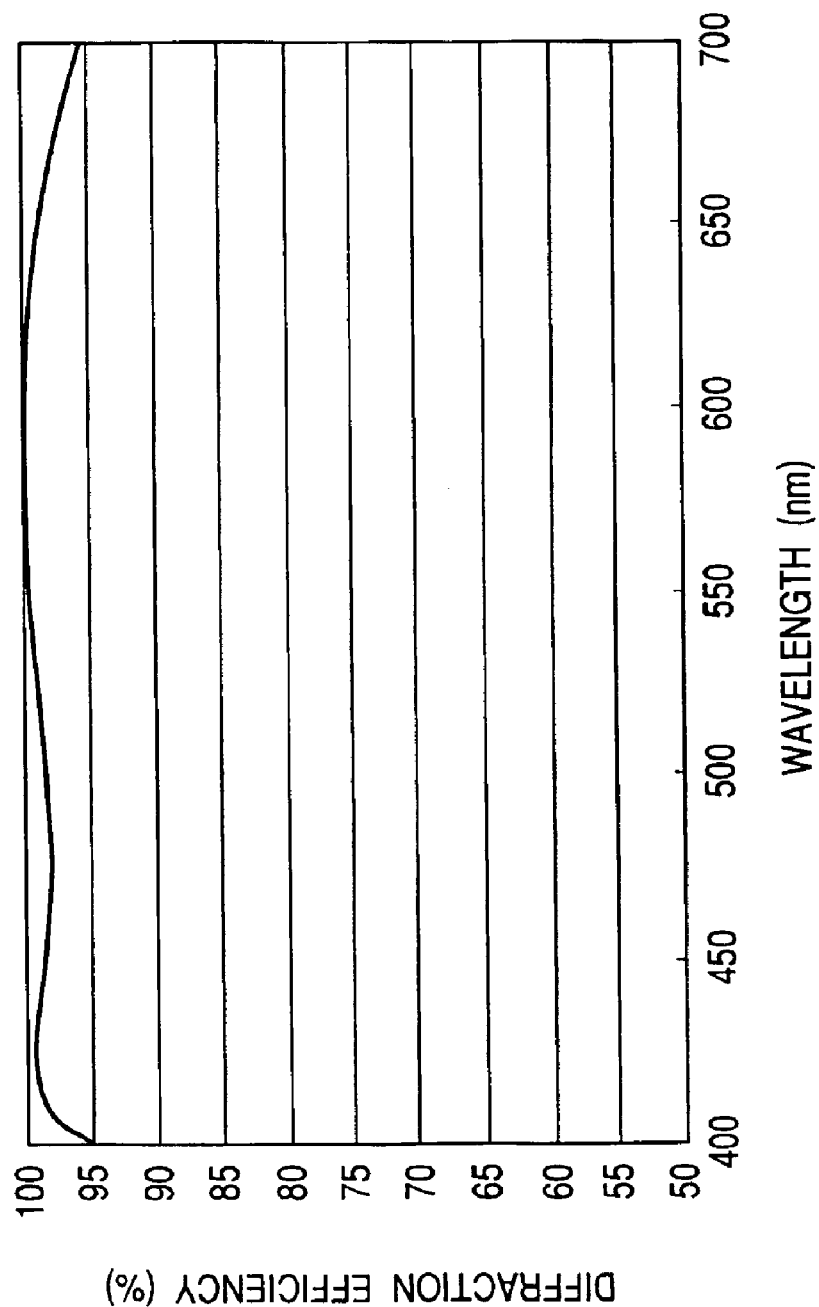
FIG. 2 is a graph showing the diffraction efficiency in the visible region of a multilayer diffractive optical element using PVCZ.
Figure 3:
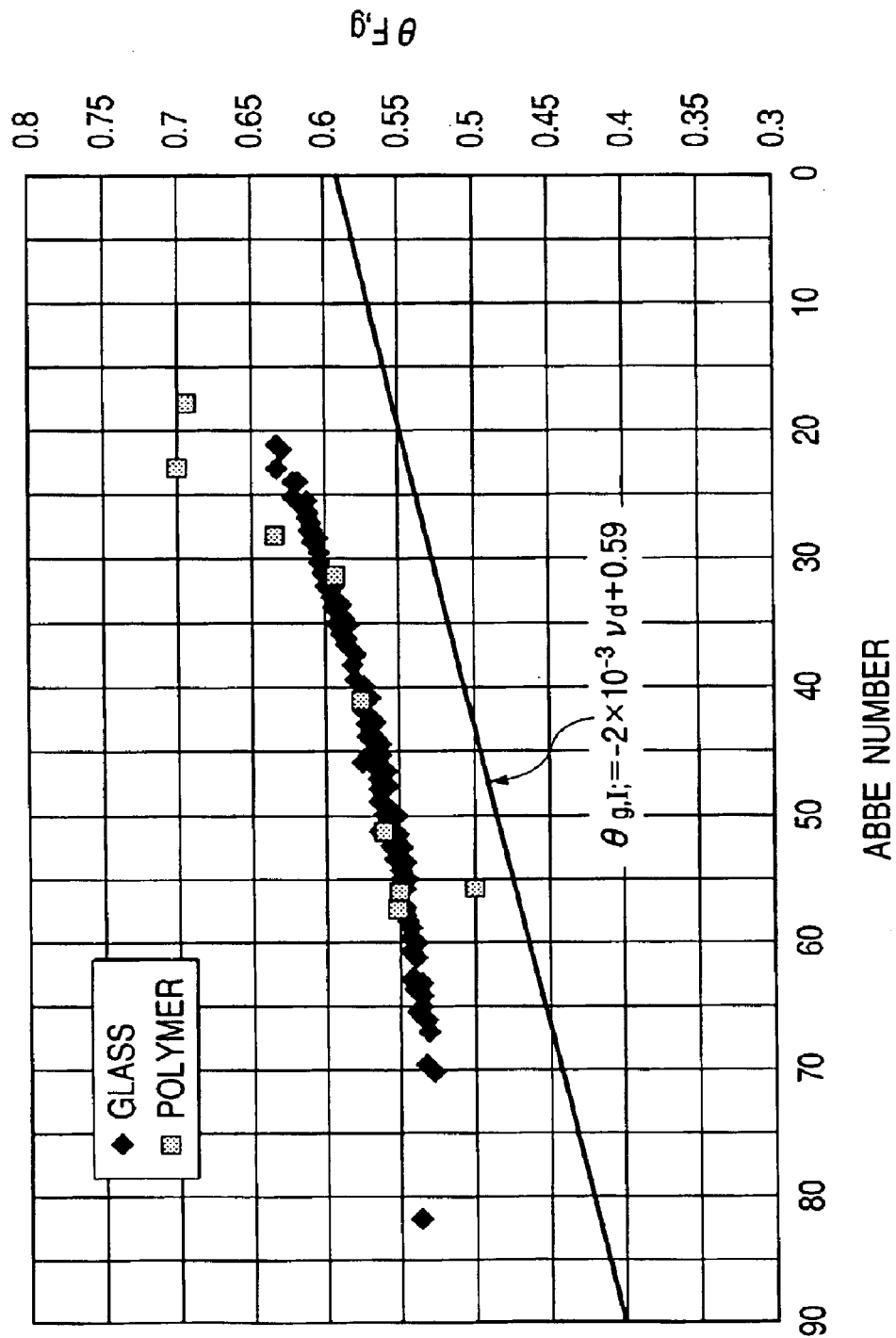
FIG. 3 is a graph shows distribution of Abbe number and second order dispersion of ordinary optical materials.

FIG. 3 shows the relation between the Abbe number and the second order dispersion for commercially available optical materials. In FIG. 3, the ordinate and abscissa axes represent the second order dispersion ($\theta_{g,F}$) and the Abbe number $\nu_d$, respectively. As can be seen from FIG. 3, these optical materials have second order dispersion values ($\theta_{g,F}$) larger than $-2\times10^{-3}\nu_d+0.59$, that is, $\theta_{g,F}>-2\times10^{-3}\nu_d+0.59$.

The present inventor has noted the importance of reducing the second order dispersion values, and studied production of optical materials of which second order dispersion of the refractive index $\theta_{g,F}$ is smaller than $-2\times10^{-3}\nu_d+0.59$ by blending a polymer optical material and a nanoparticulate inorganic oxide material having a small Abbe number not usually used for optical materials. Such inorganic oxides of small Abbe number are, for example, $TiO_2(n_d=2.2652, \nu_d=11.8)$, $Nb_2O_5(n_d=2.367, \nu_d=14.0)$, $ITO(n_d=1.8581, \nu_d=5.53)$, $Cr_2O_3(n_d=2.2178, \nu_d=13.4)$, $BaTiO_3(n_d=2.4362, \nu_d=11.3)$. As a result, the inventor has found that use of ITO realizes an optical material of which refractive index satisfies the relationship: $n_d>-6.667\times10^{-3}\nu_d+1.70$ and second dispersion of the refractive index satisfies the relation that $\theta_{g,F}\leq-2\times10^{-3}\nu_d+0.59$. In this case, it is preferable that the Abbe number $\nu_d$ of the optical material is 30 or less. If its Abbe number is larger than 30, the difference of dispersion between the optical material and a low dispersion material is too small to obtain the desired diffraction efficiency.

Then ITO was studied in more detail. ITO is different from other inorganic oxides in that the refractive index of ITO varies not only by the electronic transitions, but also by the free carriers generated by either doping with tin or by the oxygen vacancy. FIGS. 4A to 4C show three types of relationship between the wavelength and the refractive index in ITO. FIG. 4A shows the refractive index variation due to the electronic transition at each wavelength, and FIG. 4B shows the refractive index variation due to the free carrier at each wavelength. Additionally, FIG. 4C shows actual refractive index variation of ITO due to combination of electronic transition and free carrier at each wavelength. As can be seen from FIG. 4A, the dispersion due to the electronic transition varies sharply in the shorter wavelength region from 400 nm to 450 nm in the visible region. As can be seen from FIG. 4B, the dispersion due to the free carrier varies sharply in the longer wavelength region from 600 nm to 700 nm in the visible region. Combination of these two types of effects makes the second order dispersion ($\theta_{g,F}$) of the refractive index very small as compared to other inorganic oxides. Accordingly, $SnO_2$, $ATO(SnO_2$ doped with antimony) and the like, transparent and affected by the free carrier as ITO, can also be utilized.

ITO is a material usually used as a material constituting transparent electrodes, and usually used for liquid crystal displays, EL elements and the like. Usually ITO is used in a thickness ranging from 50 to 500 nm, but ITO may be used for a diffractive optical element of 50 nm or less thick by vacuum film formation. ITO can be combined with a commercially available UV curing resin as host polymer, and this allows very easy manufacture of optical materials, especially, manufacture of diffractive optical elements by photocuring.

It is preferable that the second order dispersion ($\theta_{g,F}$) is 0.45 or less for the inorganic oxide nanoparticle materials of ITO, $SnO_2$, ATO and the like, because if the second order dispersion is larger than 0.45, the difference of the dispersion from that of a material low in dispersion becomes small so that no desired diffraction efficiency can be obtained.

Additionally, when nanoparticulate ITO is used, it is preferable that the particle size is from 2 to 50 nm. The particle size larger than 50 nm enhances the light scattering of the mixture, which prevents the mixture from being used as an optical element. On the other hand, the particle size smaller than 2 nm enhances the quantum effect of the particle surface so that the desired characteristics of ITO are lost.

When optical materials containing ITO have the same Abbe number, materials that satisfy the condition that $n_d>-6.667\times10^{-3}\nu_d+1.70$ are small in second order dispersion ($\theta_{g,F}$) in comparison with those that satisfy the condition that $n_d\leq-6.667\times10^{-3}\nu_d+1.70$. Thus, the former materials have a significant effect on the reduction of the diffracted lights of the orders other than the design order.

Additionally, polystyrene is most suitable as a polymer to contain ITO because polystyrene can be mixed with and uniformly disperse the ITO nanoparticles. The polystyrene containing ITO can be obtained by curing the styrene monomer added with the ITO nanoparticle material. Incidentally, the polymer containing ITO is not limited to polystyrene, but may include any polymer containing ITO so long as the obtained optical material satisfies the conditions that $n_d>-6.667\times10^{-3}\nu_d+1.70$ and $\theta_{g,F}\leq-2\times10^{-3}\nu_d+0.59$.

As described above, the use of an optical material, having the characteristics that $n_d>-6.667\times10^{-3}\nu_d+1.70$ and ($\theta_{g,F}$) $\leq-2\times10^{-3}\nu_d+0.59$, obtained by adding ITO nanoparticles to an optical material such as a polymer makes it possible to provide an optical element for more exactly corrected chromatic aberration. Additionally, the use of such an optical material makes it possible to provide an optical element free from the partial reduction of the diffraction efficiency and stable in diffraction efficiency over the entire working wavelength region.

Although description has been restricted to the diffractive optical system as far as the present embodiment is concerned, the present invention is not limited to the diffractive optical system. The present invention can also be applied to the refractive optical system which takes advantage of the characteristic that the second order dispersion of the dispersion is small.

EXAMPLE 1

The structure of a laminated diffractive optical element and a manufacture method thereof are described in this Example 1 with reference to FIGS. 5A, 5B and 5C to 8.

First, to 100 g of a 4.4 wt % dispersion in chloroform of ITO nanoparticles of 10 nm average particle size, 12 g of styrene monomer and 0.15 g of 1-hydroxycyclohexylphenyl ketone as photoinitiator were added, and then chloroform was removed under reduced pressure to obtain an optical raw material 2.

Then, as shown in FIG. 5A, the optical raw material 2 was put in a mold 1 machined for a diffraction grating. Subsequently, as shown in FIG. 5B, a flat glass plate 3 (BK7) was laid on the optical material 2, and irradiation was made with a dose of 20,000 mJ/cm² (100 mW/cm², 200 seconds) using a UV irradiation system (EX250: manufactured by HOYA-SCHOTT Co.). Then, as FIG. 5C shows, the cured optical material 2' was released from the mold 1 as a diffractive optical element 4. During UV cure of the optical raw material 2, polymerization of styrene proceeded to form an optical material composed of polystyrene and the ITO nanoparticle material. Accordingly, the optical characteristics of the optical material 2' were: $n_d$=1.606, $v_d$=22.7 and $\theta_{g,F}$=0.495, satisfying $n_d > -6.667 \times 10^{-3} v_d + 1.70$ and $\theta_{g,F} \leq -2 \times 10^{-3} v_d + 0.59$.

Separately, to form a counterpart optical element, a photocurable resin 6 having optical characteristics that $n_d$=1.513 and $v_d$=51.0 was prepared. As FIG. 6A shows, a mold 5 machined for a diffraction grating was heated to 280° C. in a nitrogen atmosphere, and then the photocuring resin 6 was poured into a mold 5 machined for a diffraction grating. A flat glass plate 7 (BK7) was laid thereon, and pressed as shown in FIG. 6B. Then, irradiation was done with a dose of 3,000 mJ/cm² (100 mW/cm², 30 seconds) using a UV light irradiation system (EX250: manufactured by HOYA-SCHOTT Co., not shown), and then the cured optical material 6' was released from the mold to obtain a diffractive optical element 8 as shown in FIG. 6C.

Figure 7:
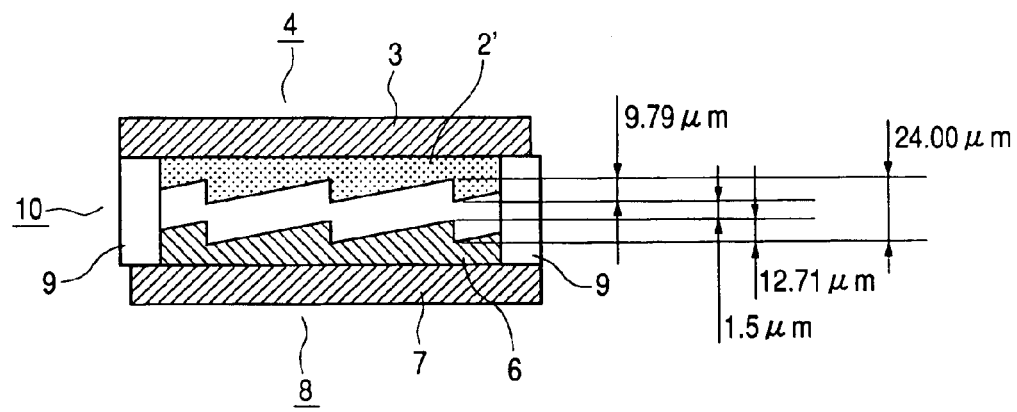
FIG. 7 is a schematic sectional view showing the structure of a multilayer diffractive optical element in Example 1.

Subsequently, antireflection films were provided on the diffracting surfaces of the diffractive optical elements 4 and 8, and then a laminated diffractive optical element 10 was manufactured by combining these diffractive optical elements in such a way that the diffraction gratings of these elements were opposing to each other as FIG. 7 shows. Reference numeral 9 denotes a spacer which determined the space between the diffractive optical elements 4 and 8. The grating pitches of the diffractive optical elements 4 and 8 were both 80.00 μm. The space between the opposing grooves and peaks of the diffractive optical elements 4 and 8 were 24.00 μm, 1.50 μm, respectively. The peak height of the diffractive optical element 4 is 9.79 μm, and that of the element 8 was 12.71 μm.

Figure 8:
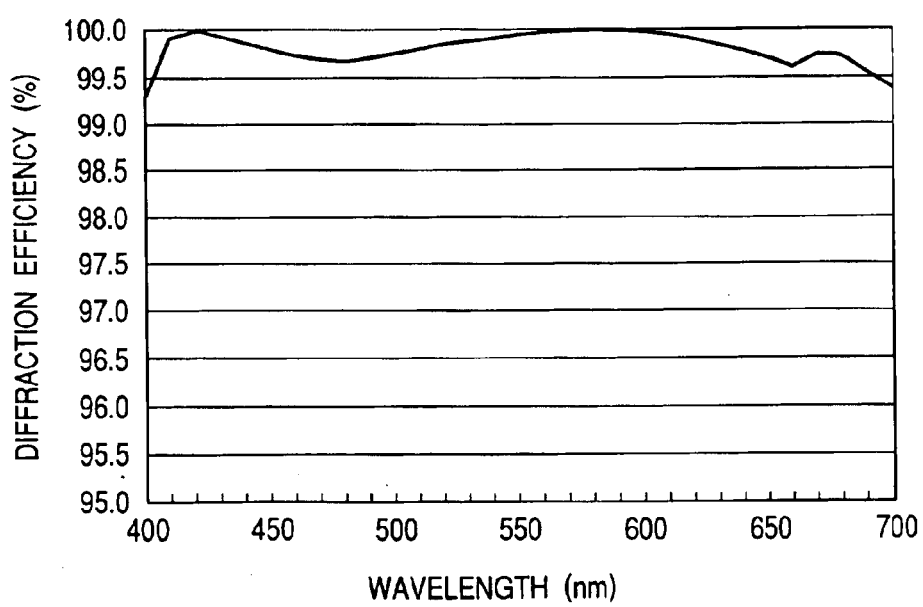
FIG. 8 is a graph showing the first order diffracted light intensity of the multilayer diffractive optical element in Example 1.

FIG. 8 is a graph showing the first order diffracted light intensity of the manufactured laminated diffractive optical element 10 at the incident angle of 0° as a function of wavelength from 400 nm to 700 nm. The abscissa and ordinate axes represent the wavelength and the diffraction efficiency, respectively. In FIG. 8, the diffraction efficiencies at the wavelengths of 400, 500 and 700 nm are 99.3%, 99.7% and 99.4%, respectively. Accordingly, the diffraction efficiency of the laminated diffractive optical element 10 is 99% or more in the whole working wavelength range, i.e., very satisfactory intensity distribution with wavelength.

EXAMPLE 2

The structure of a laminated diffractive optical element and a manufacture method thereof are described in this Example 2 with reference to FIGS. 9A to 9C, 6A to 6C, 10 and 11.

First, to 100 g of a 8.8 wt % dispersion in chloroform of ITO nanoparticles of 10 nm average particle size, 12 g of styrene monomer and 0.15 g of 1-hydroxycyclohexylphenyl ketone as a photoinitiator were added, and then chloroform was removed under reduced pressure to obtain an optical raw material 12.

Then, as shown in FIG. 9A, the optical raw material 12 was put in a mold 11 machined for a diffraction grating. Subsequently, as shown in FIG. 9B, a flat glass plate 13 (BK7) was laid on the optical material 12, and irradiation was made with a dose of 20,000 mJ/cm² (100 mW/cm², 200 seconds) using a UV irradiation system (EX250: manufactured by HOYA-SCHOTT Co.). Then, as FIG. 9C shows, the cured optical material 12' was released from the mold 11 as a diffractive optical element 14. During UV cure of the optical raw material 12, polymerization of styrene proceeded to form an optical material composed of polystyrene and the ITO nanoparticle material. Accordingly, the optical characteristics of the optical material forming the optical material 12' were such that $n_d$=1.620, $v_d$=18.2 and $\theta_{g,F}$=0.442, satisfying $n_d > -6.667 \times 10^{-3} v_d + 1.70$ and $\theta_{g,F} \leq -2 \times 10^{-3} v_d + 0.59$.

Separately, to form a counterpart optical element, a photocurable resin 6 having optical characteristics that $n_d$=1.513 and $v_d$=51.0 was prepared as in Example 1, and as shown in FIGS. 6A to 6C to obtain a diffractive optical element 8 in the same manner as in Example 1.

Figure 10:
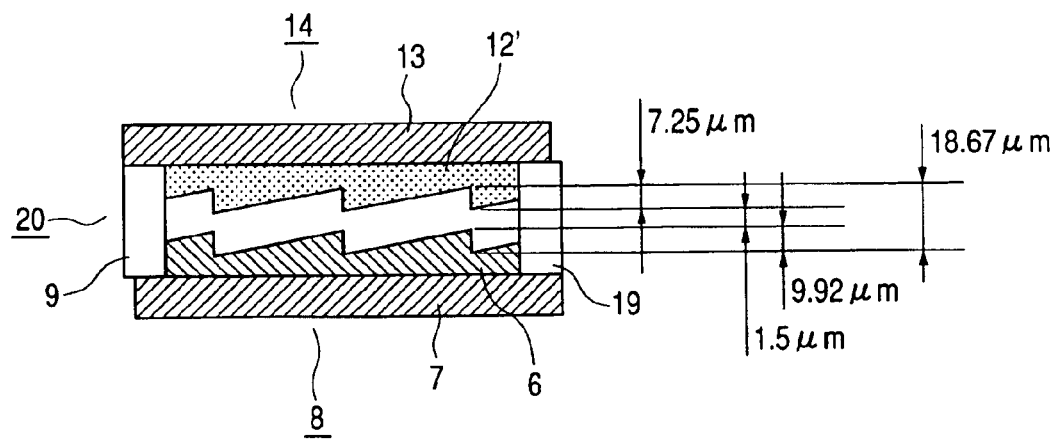
FIG. 10 is a schematic sectional view showing the structure of a multilayer diffractive optical element in Example 2.

Subsequently, antireflection films were provided on the diffracting surfaces of the diffractive optical elements 14 and 8, and then a laminated diffractive optical element 20 was manufactured by combining these diffractive optical elements in such a way that the diffraction gratings of these elements were opposing to each other as FIG. 10 shows. Reference numeral 19 denotes a spacer which determined the space between the diffractive optical elements 14 and 8. The grating pitches of the diffractive optical elements 14 and 8 were both 85.00 μm. The space between the opposing grooves and peaks of the diffractive optical elements 14 and 8 were 18.67 μm, 1.50 μm, respectively. The peak height of the diffractive optical element 14 is 7.25 μm, and that of the element 8 was 9.92 μm.

Figure 11:
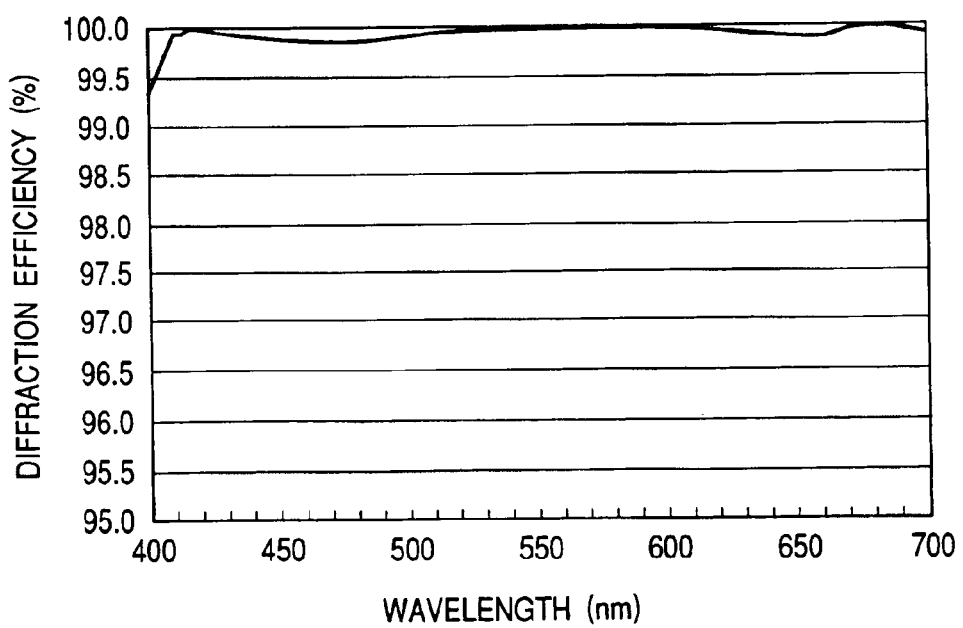
FIG. 11 is a graph showing the first order diffracted light intensity of the multilayer diffraction optical element in Example 2.

FIG. 11 is a graph showing the first order diffracted light intensity of the manufactured laminated diffractive optical element 20 at the incident angle of 0° as a function of wavelength from 400 nm to 700 nm. The abscissa and ordinate axes represent the wavelength and the diffraction efficiency, respectively. In FIG. 11, the diffraction efficiencies at the wavelengths of 400, 500 and 700 nm are 99.3%, 99.9% and 99.9%, respectively. Accordingly, the diffraction efficiency of the laminated diffractive optical element 20 is 99% or more in all over the working wavelength range, i.e., showing very satisfactory wavelength distribution of intensity.

EXAMPLE 3

The structure of a laminated diffractive optical element and a manufacture method thereof are described in this Example 3 with reference to FIGS. 12A to 12C, 6A to 6C, 13 and 14.

First, to 200 g of a 10 wt % dispersion in chloroform of ITO nanoparticles of 10 nm average particle size, 12 g of styrene monomer and 0.15 g of 1-hydroxycyclohexylphenyl ketone as a photoinitiator were added, and then chloroform was removed under reduced pressure to obtain an optical raw material 22.

Then, as shown in FIG. 12A, the optical raw material 22 was put in a mold 21 machined for a diffraction grating. Subsequently, as shown in FIG. 12, a flat glass plate 23 (BK7) was laid on the optical material 22, and irradiation was made with a dose of 20,000 mJ/cm² (100 mW/cm², 200 seconds) using a UV irradiation system (EX250: manufactured by HOYA-SCHOTT Co.). Then, as FIG. 12C shows, the cured optical material 22' was released from the mold 21 as a diffractive optical element 24. During UV cure of the optical raw material 22, polymerization of styrene proceeded to form an optical material composed of polystyrene and the ITO nanoparticle material. Accordingly, the optical characteristics of the optical material forming the optical material 12' were such that $n_d$=1.648, $v_d$=13.3 and $\theta_{g,F}$=0.385, satisfying $n_d > -6.667 \times 10^{-3} v_d + 1.70$ and $\theta_{g,F} \leq -2 \times 10^{-3} v_d + 0.59$.

Separately, to form a counterpart optical element, a photocurable resin 6 having optical characteristics that $n_d$=1.513 and $v_d$=51.0 was prepared as in Example 1, and as shown in FIGS. 6A to 6C to obtain a diffractive optical element 8 in the same manner as in Example 1.

Figure 13:
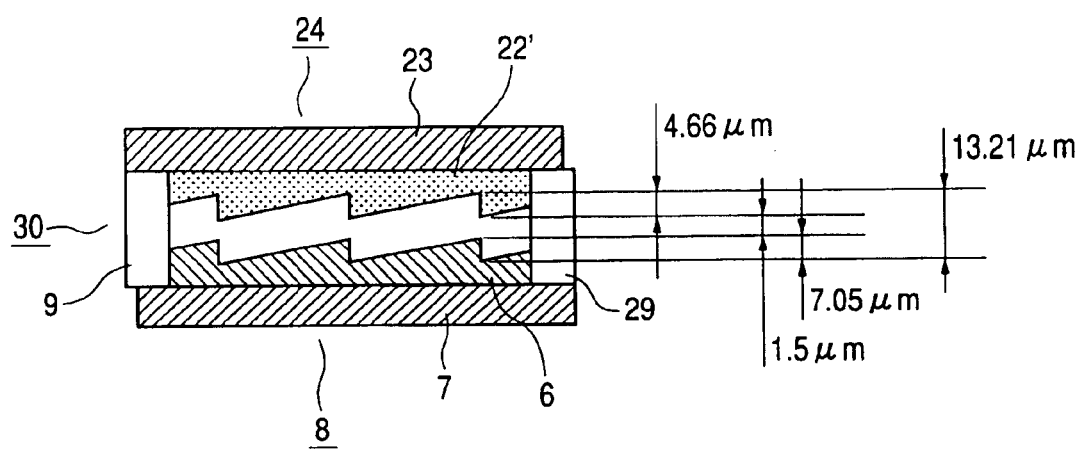
FIG. 13 is a schematic sectional view showing the structure of a multilayer diffractive optical element in Example 3.

Subsequently, antireflection films were provided on the diffracting surfaces of the diffractive optical elements 24 and 8, and then a laminated diffractive optical element 30 was manufactured by combining these diffractive optical elements in such a way that the diffraction gratings of these elements were opposing to each other as FIG. 13 shows. Reference numeral 29 denotes a spacer which determined the space between the diffractive optical elements 24 and 8. The grating pitches of the diffractive optical elements 24 and 8 were both 80.00 μm. The space between the opposing grooves and peaks of the diffractive optical elements 24 and 8 were 13.21 μm, 1.50 μm, respectively. The peak height of the diffractive optical element 24 is 4.66 μm, and that of the element 8 was 7.05 μm.

Figure 14:
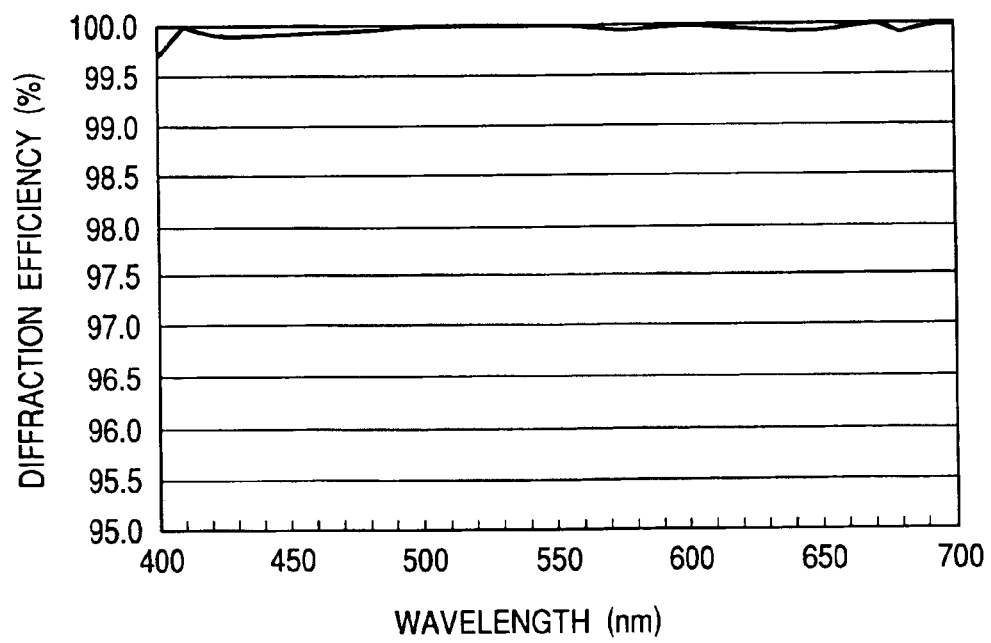
FIG. 14 is a graph showing the first order diffracted light intensity of the multilayer diffractive optical element in Example 3.

FIG. 14 is a graph showing the first order diffracted light intensity of the manufactured laminated diffractive optical element 30 at the incident angle of 0° as a function of wavelength from 400 nm to 700 nm. The abscissa and ordinate axes represent the wavelength and the diffraction efficiency, respectively. In FIG. 14, the diffraction efficiencies at the wavelengths of 400, 500 and 700 nm are 99.7%, 100% and 100%, respectively. Accordingly, the diffraction efficiency of the laminated diffractive optical element 30 is 99% or more in all over the working wavelength range, i.e., showing very satisfactory wavelength distribution of intensity.

EXAMPLE 4

The structure of a laminated diffractive optical element and a manufacture method thereof are described in this Example 4 with reference to FIGS. 15A to 15I, 6A to 6C, 16, and 17.

First, an optical raw material 32 was prepared from methyl methacrylate and 1% 1-hydroxycyclohexylphenyl ketone.

Figure 15A:
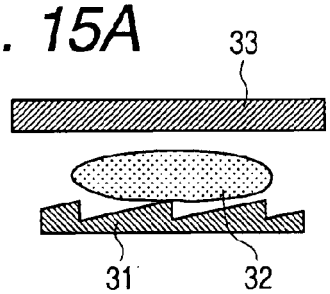
FIGS. 15A, 15B, 15C, 15D, 15E, 15F, 15G, 15H and 15I are schematic sectional views showing the process for forming an optical element in Example 4.
Figure 15B:
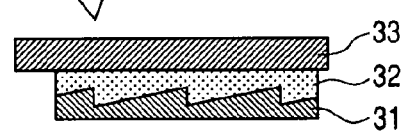
Figure 15C:
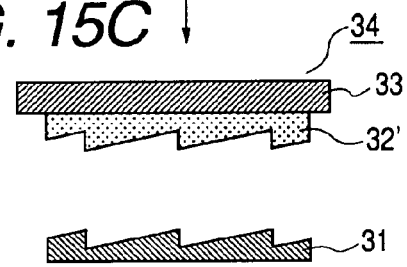
Figure 15D:
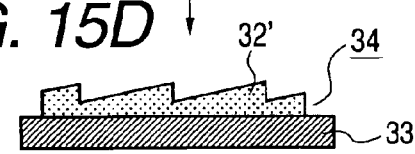
Figure 15E:
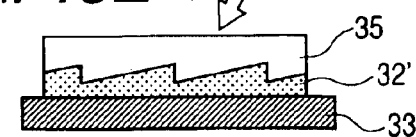
Figure 15F:
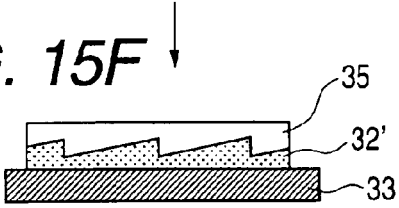
Figure 15G:
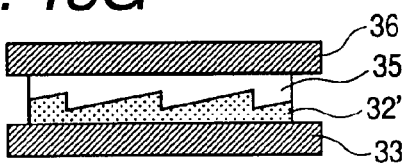
Figure 15H:
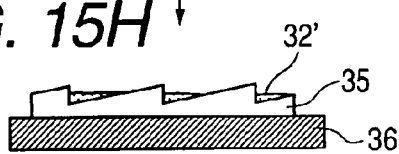
Figure 15I:
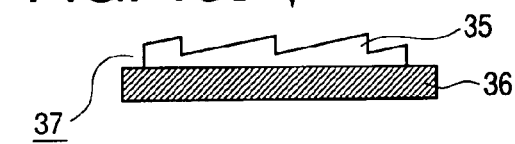

Then, as shown in FIG. 15A, the optical raw material 32 was put in a mold 31 machined for a diffraction grating. Subsequently, as shown in FIG. 15B, a flat glass plate 33 (BK7) was laid on the optical material 32, and irradiation was made with a dose of 30,000 mJ/cm² (100 mW/cm², 30 seconds) using a UV irradiation system (EX250: manufactured by HOYA-SCHOTT Co.). Then, as FIG. 15C shows, the cured optical material 32' was released from the mold 31 as a diffractive optical element 34. Then, as shown in FIG. 15E, an approximately 2 μm thick ITO film 35 was formed in vacuum of 2×10⁻⁴ Pa on the optical material 32'. Then the surface of the ITO film 35 was polished as shown in FIG. 15F, to form a surface as flat as of one or less Newton line. Then, as shown in FIG. 15G, a glass plate 36 coated with a silane coupling agent was bonded to the ITO film 35. Next, the cured PMMA was dissolved and removed by soaking in methyl isobutyl ketone to obtain an ITO diffractive element 37 as shown in FIG. 15I. The optical characteristics of the ITO were $n_d$=1.857, $v_d$=5.7 and $\theta_{g,F}$=0.291.

Separately, to form a counterpart optical element, a photocurable resin 6 having optical characteristics that $n_d$=1.513 and $v_d$=51.0 was prepared as in Example 1, and as shown in FIGS. 6A to 6C to obtain a diffractive optical element 8 in the same manner as in Example 1.

Figure 16:
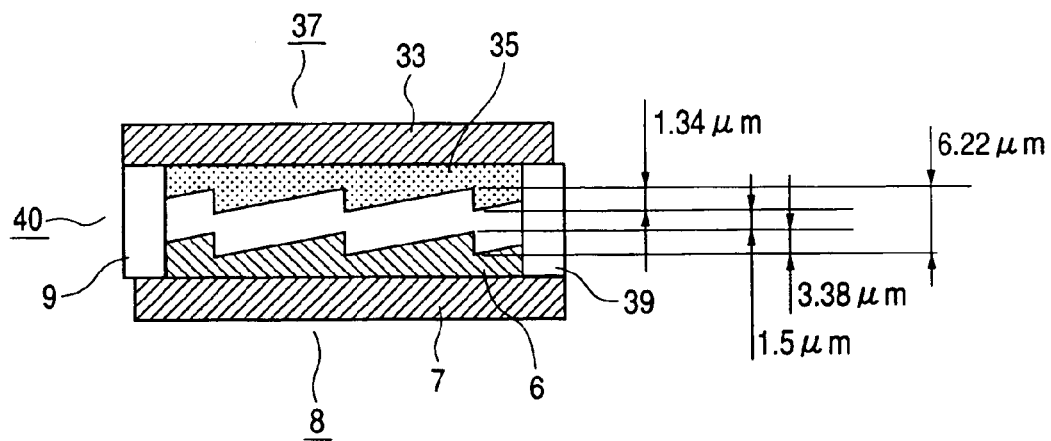
FIG. 16 is a schematic sectional view showing the structure of a multilayer diffractive optical element in Example 4.

Subsequently, antireflection films were provided on the diffracting surfaces of the diffractive optical elements 37 and 8, and then a laminated diffractive optical element 40 was manufactured by combining these diffractive optical elements in such a way that the diffraction gratings of these elements were opposing to each other as FIG. 16 shows. Reference numeral 29 denotes a spacer which determined the space between the diffractive optical elements 37 and 8. The grating pitches of the diffractive optical elements 37 and 8 were both 80.00 μm. The space between the opposing grooves and peaks of the diffractive optical elements 37 and 8 were 6.22 μm, 1.50 μm, respectively. The peak height of the diffractive optical element 37 was 1.34 μm, and that of the element 8 was 3.38 μm.

Figure 17:
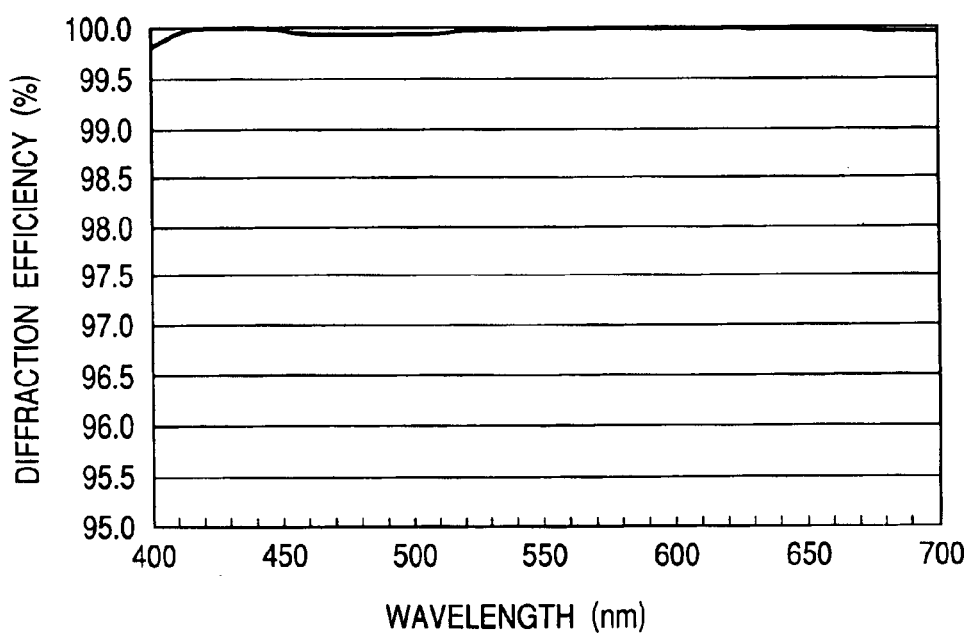
FIG. 17 is a graph showing the first order diffracted light intensity of the multilayer diffractive optical element in Example 4.

FIG. 17 is a graph showing the first order diffracted light intensity of the manufactured laminated diffractive optical element 40 at the incident angle of 0° as a function of wavelength from 400 nm to 700 nm. The abscissa and ordinate axes represent the wavelength and the diffraction efficiency, respectively. In FIG. 17, the diffraction efficiencies at the wavelengths of 400, 500 and 700 nm are 99.8%, 100% and 100%, respectively. Accordingly, the diffraction efficiency of the laminated diffractive optical element 40 is 99% or more in all over the working wavelength range, i.e., showing very satisfactory wavelength distribution of intensity.

COMPARATIVE EXAMPLE 1

The structure of a laminated diffractive optical element and a manufacture method thereof are described in this Comparative Example 1 with reference to FIGS. 18A to 18C, 6A to 6C, 19 and 20. In Comparative Example 1, instead of the optical raw material 2 described in Example 1, a photocuring resin 102 having the optical characteristics of $n_d$=1.636, $v_d$=22.8 and $\theta_{g,F}$=0.697 was used as an optical raw material. The optical characteristics satisfy the condition that $n_d > -6.667 \times 10^{-3} v_d + 1.70$, but do not satisfy the condition that $\theta_{g,F} \leq -2 \times 10^{-3} v_d + 0.59$.

As FIG. 18A shows, the photocurable resin 102 was put into a mold 101. As FIG. 18B shows, a flat glass plate 103 (BK7) was laid on the resin 102 and pressed, and irradiation was made with a dose of 20,000 mJ/cm² (100 mW/cm², 200 seconds) using a UV light irradiation system (EX250: manufactured by HOYA-SCHOTT Co.) not shown in the figure. Then, as FIG. 18C shows, the cured optical material 102' was released from the mold 101 to obtain a diffractive optical element 104.

Separately, to form a counterpart optical element, a photocurable resin 6 having optical characteristics that $n_d$=1.513 and $v_d$=51.0 was prepared as in Example 1, and as shown in FIGS. 6A to 6C to obtain a diffractive optical element 8 in the same manner as in Example 1.

Figure 19:
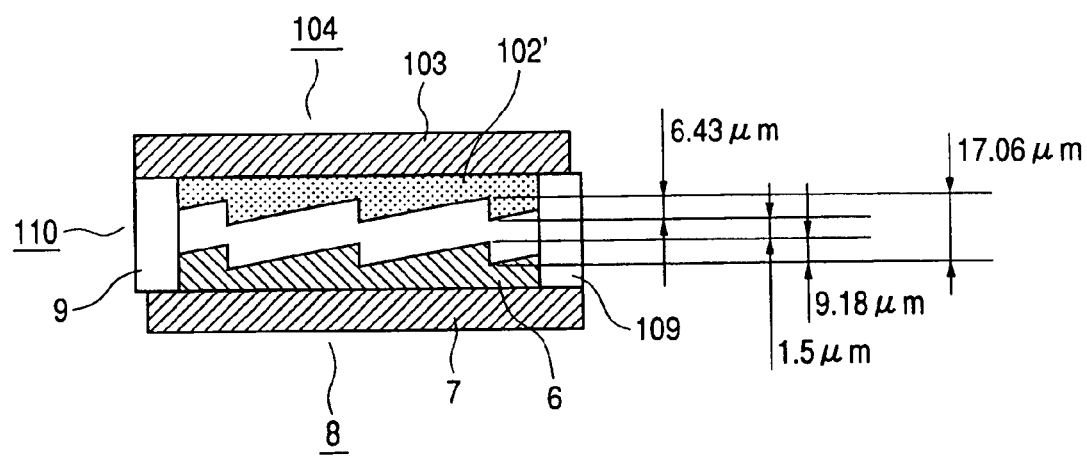
FIG. 19 is a schematic sectional view showing the structure of a multilayer diffractive optical element in Comparative Example 1.

Subsequently, antireflection films were provided on the diffracting surfaces of the diffractive optical elements 104 and 8, and then a laminated diffractive optical element 110 was manufactured by combining these diffractive optical elements in such a way that the diffraction gratings of these elements were opposing to each other as FIG. 19 shows. Reference numeral 109 denotes a spacer which determined the space between the diffractive optical elements 104 and 8. The grating pitches of the diffractive optical elements 104 and 8 were both 80.00 μm. The space between the opposing grooves and peaks of the diffractive optical elements 104 and 8 were 17.06 μm, 1.50 μm, respectively. The peak height of the diffractive optical element 104 is 6.43 μm, and that of the element 8 was 9.13 μm.

Figure 20:
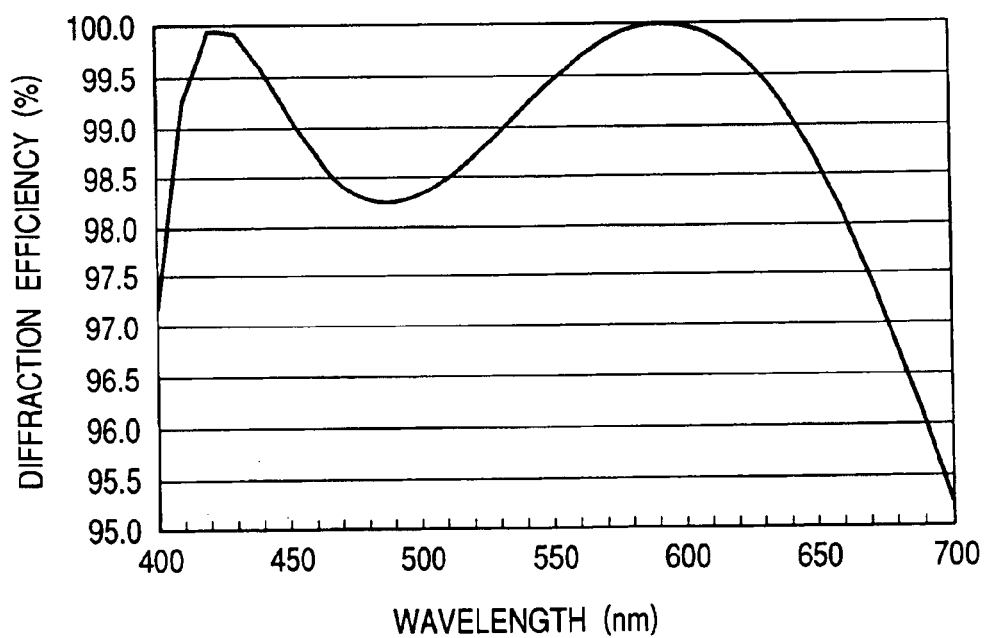
FIG. 20 is a graph showing the first order diffracted light intensity of the multilayer diffractive optical element in Comparative Example 1.

FIG. 20 is a graph showing the first order diffracted light intensity of the manufactured laminated diffractive optical element 110 at the incident angle of 0° as a function of wavelength from 400 nm to 700 nm. The abscissa and ordinate axes represent the wavelength and the diffraction efficiency, respectively. In FIG. 20, the diffraction efficiencies at the wavelengths of 400, 500 and 700 nm are 97%, 98.3% and 95.3%, respectively. Accordingly, the diffraction efficiency of the laminated diffractive optical element 110 was lower over the whole working wavelength region than those of the laminated diffractive optical elements in Examples 1 to 4. Particularly, the diffraction efficiency is markedly low in the ranges from 400 nm to 410 nm, from 450 nm to 530 nm and from 650 nm to 700 nm.

COMPARATIVE EXAMPLE 2

The structure of a laminated diffractive optical element and a manufacture method thereof are described in this Comparative Example 2 with reference to FIGS. 21A to 21C, 6A to 6C, 22 and 23.

First, to 200 g of a 10 wt % dispersion in methylethyl ketone of ITO nanoparticles of 10 nm average particle size, 12 g of methylmethacrylate and 0.15 g of 1-hydroxycyclohexylphenyl ketone as a photoinitiator were added, and then MEK was removed under reduced pressure to obtain an optical raw material 122.

Figure 21A:
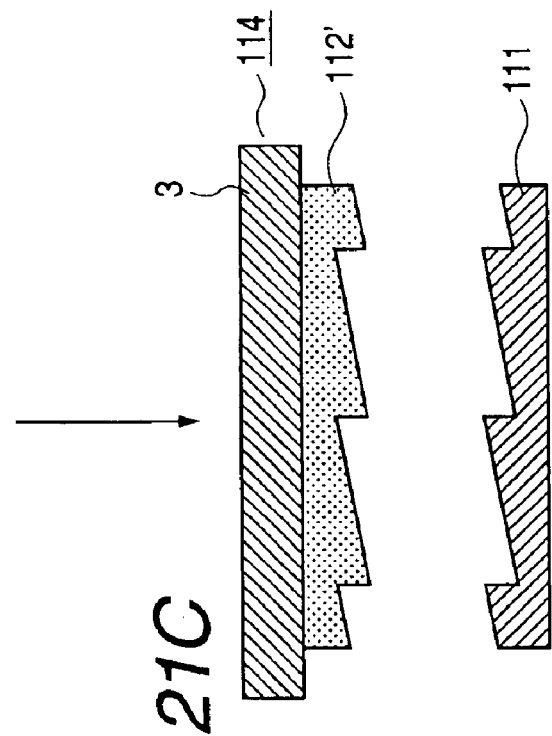
FIGS. 21A, 21B and 21C are schematic sectional views showing the processes for forming an optical element in Comparative Example 2.
Figure 21B:
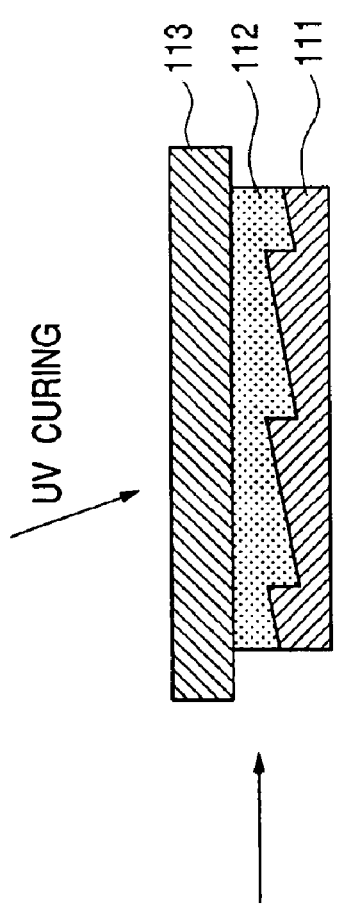
Figure 21C:
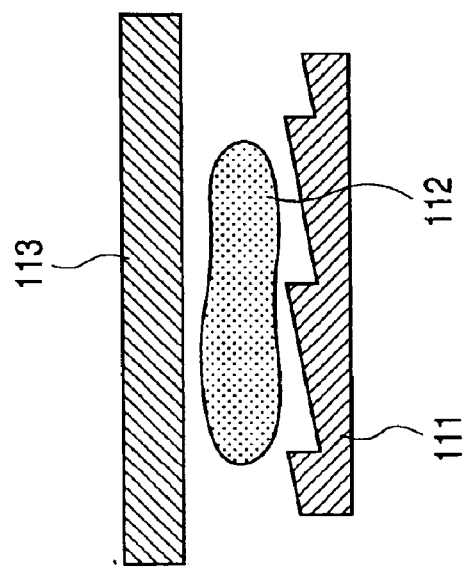

Then, as shown in FIG. 21A, the optical raw material 112 was put in a mold 111 machined for a diffraction grating. Subsequently, as shown in FIG. 21B, a flat glass plate 113 (BK7) was laid on the optical material 112, and irradiation was made with a dose of 20,000 mJ/cm² (100 mW/cm², 200 seconds) using a UV irradiation system (EX250: manufactured by HOYA-SCHOTT Co.). Then, as FIG. 21C shows, the cured optical material 112' was released from the mold 111 as a diffractive optical element 114. The optical characteristics of the optical material 112' were such that $n_d$=1.523, $v_d$=23.0 and $\theta g,F$=0.53, satisfying $\theta_{g,F} \leq -2 \times 10^{-3} v_d + 0.59$, but not $n_d > -6.667 \times 10^{-3} v_d + 1.70$.

Separately, to form a counterpart optical element, a photocurable resin 6 having optical characteristics that $n_d$=1.513 and $v_d$=51.0 was prepared as in Example 1, and as shown in FIGS. 6A to 6C to obtain a diffractive optical element 8 in the same manner as in Example 1.

Figure 22:
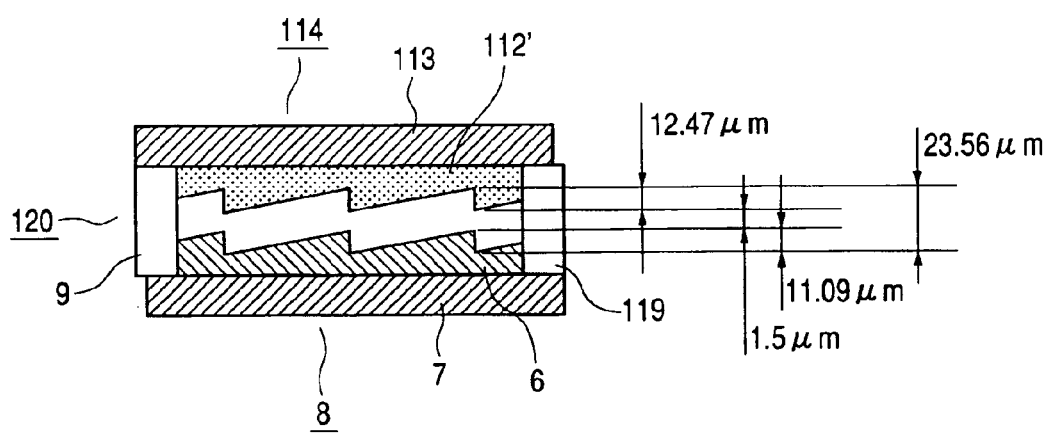
FIG. 22 is a schematic sectional view showing the structure of a multilayer diffractive optical element in Comparative Example 2.

Subsequently, antireflection films were provided on the diffracting surfaces of the diffractive optical elements 114 and 8, and then a laminated diffractive optical element 120 was manufactured by combining these diffractive optical elements in such a way that the diffraction gratings of these elements were opposing to each other as shown in FIG. 22. Reference numeral 119 denotes a spacer which determined the space between the diffractive optical elements 114 and 8. The grating pitches of the diffractive optical elements 114 and 8 were both 80.00 μm. The space between the opposing grooves and peaks of the diffractive optical elements 114 and 8 were 23.56 μm, 1.50 μm, respectively. The peak height of the diffractive optical element 114 was 12.47 μm, and that of the element 8 was 11.09 μm.

Figure 23:
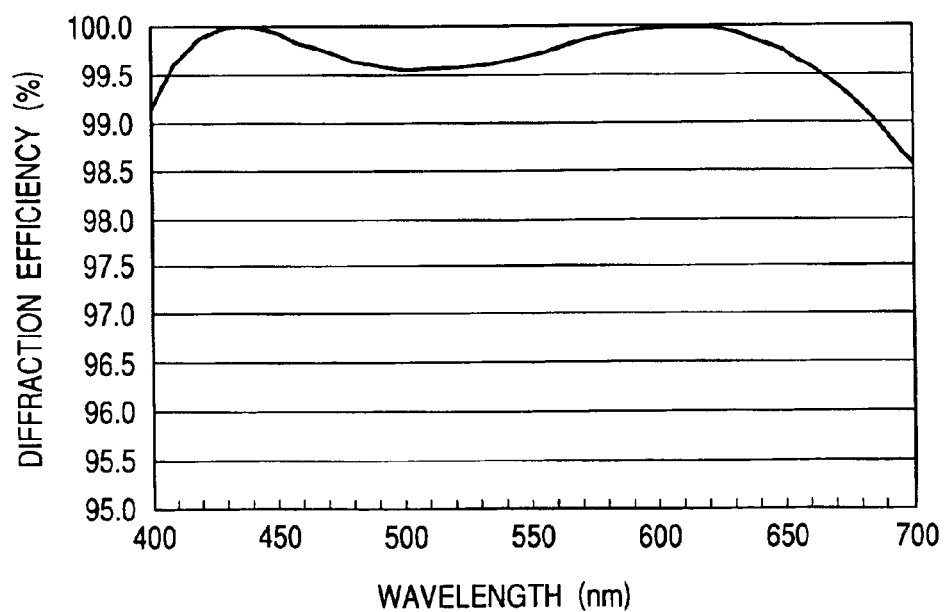
FIG. 23 is a graph showing the first order diffracted light intensity of the multilayer diffractive optical element in Comparative Example 2.

FIG. 23 is a graph showing the first order diffracted light intensity of the manufactured laminated diffractive optical element 120 at the incident angle of 0° as a function of wavelength from 400 nm to 700 nm. The abscissa and ordinate axes represent the wavelength and the diffraction efficiency, respectively. In FIG. 23, the diffraction efficiencies at the wavelengths of 400, 500 and 700 nm are 99.1%, 99.5% and 98.6%, respectively. Accordingly, the diffraction efficiency of the laminated diffractive optical element 120 is low over the working wavelength region in comparison with the laminated diffractive optical elements in Examples 1 to 4.

COMPARATIVE EXAMPLE 3

The structure of a laminated diffractive optical element and a manufacture method thereof are described in this Comparative Example 2 with reference to FIGS. 24A to 24C, 6A to 6C, 25 and 26. In Comparative Example 3, an optical raw material 122 was prepared in the same manner as in Example 1 except that N-vinylcarbazole (from Tokyo Kasei Kogyo Co., Ltd.) and 1% 1-hydroxycyclohexylphenyl ketone were used.

As FIG. 24A shown, the optical raw material 122 was put in a mold 121. Then, as in FIG. 24B, a flat glass plate 123 (BK7) was laid on the optical raw material 122 and pressed, followed by irradiation at a dose of 20,000 mJ/cm² (100 mW/cm², 200 seconds) using a UV light irradiation system (EX250: manufactured by HOYA-SCHOTT Co.) (not shown) at 70° C. After cooling down to room temperature over 4 hours, the cured optical material 122' was released from the mold 121 to obtain a diffractive optical element 124 as shown in FIG. 24C. The optical characteristics of the optical material 122' were such that $n_d$=1.699, $v_d$=17.4 and $\theta_{g,F}$=0.694, satisfying $n_d > -6.667 \times 10^{-3} v_d + 1.70$, but not $\theta_{g,F} \leq -2 \times 10^{-3} v_d + 0.59$.

On one hand, as the optical material for forming a counterpart optical element, the photocuring resin 6 having the optical characteristics that $n_d$=1.513 and $v_d$=51.0 was prepared in the same manner as in Example 1, and a diffractive optical element 8 was manufactured in the same manner as in Example 1 as shown in FIGS. 6A to 6C.

Figure 25:
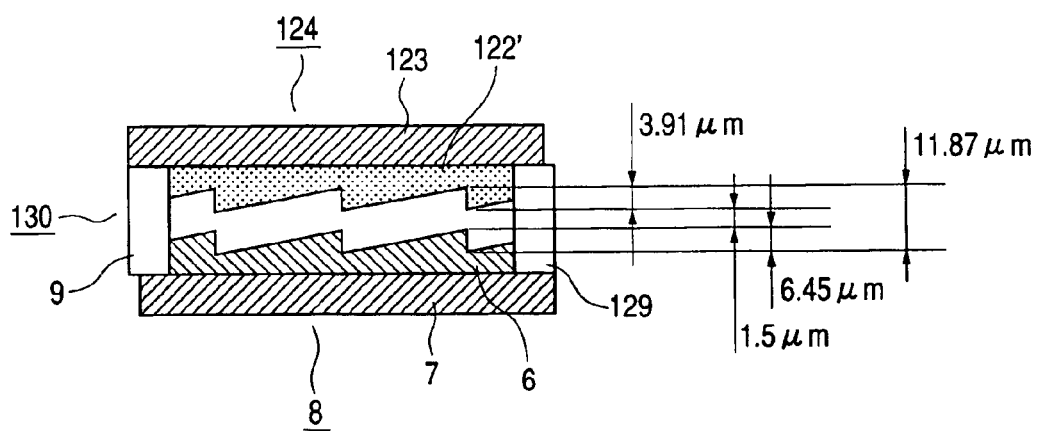
FIG. 25 is a schematic sectional view showing the structure of a multilayer diffractive optical element in Comparative Example 3.

Subsequently, antireflection films were provided on the diffracting surfaces of the diffractive optical elements 124 and 8, and then a laminated diffractive optical element 130 was manufactured by combining these diffractive optical elements in such a way that the diffraction gratings of these elements were opposing to each other as shown in FIG. 25. Reference numeral 129 denotes a spacer which determined the space between the diffractive optical elements 124 and 8. The grating pitches of the diffractive optical elements 124 and 8 were both 80.00 μm. The space between the opposing grooves and peaks of the diffractive optical elements 124 and 8 were 11.87 μm, 1.50 μm, respectively. The peak height of the diffractive optical element 124 was 3.91 μm, and that of the element 8 was 6.45 μm.

Figure 26:
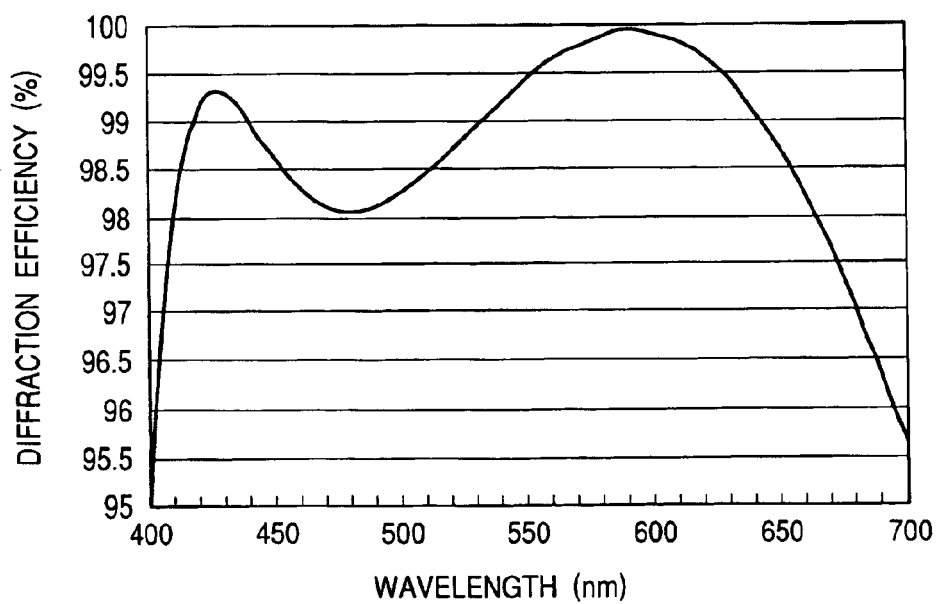
FIG. 26 is a graph showing the first order diffracted light intensity of the multilayer diffractive optical element in Comparative Example 3.

FIG. 26 is a graph showing the first order diffracted light intensity of the manufactured laminated diffractive optical element 130 at the incident angle of 0° as a function of wavelength from 400 nm to 700 nm. The abscissa and ordinate axes represent the wavelength and the diffraction efficiency, respectively. In FIG. 26, the diffraction efficiencies at the wavelengths of 400, 500 and 700 nm are 95.0%, 98.4% and 95.4% respectively. Accordingly, the diffraction efficiency of the laminated diffractive optical element 130 is low in comparison with the laminated diffractive optical elements in Examples 1 to 4, overall.

Table 1 shows the diffraction efficiencies of the first order diffracted light, the incident angle of 0°, wavelength 400 nm, 500 nm and 700 nm, of Examples 1 to 4 and Comparative Examples 1 to 3. In Table 1, Condition 1 represents $n_d > -6.667 \times 10^{-3} v_d + 1.70$, and Condition 2 represents $\theta_{g,F} \leq -2 \times 10^{-3} v_d + 0.59$, and "S" signifies that the material satisfies the condition, and "NS" signifies that the material does not satisfy the condition. Generally, satisfactory diffraction efficiency of a laminated diffractive optical element is 99% or more. Accordingly, for the evaluation of the experimental results of the present invention, when the diffraction efficiency was 99% or more over the visible wavelength region of 400 nm to 700 nm, it was evaluated satisfactory (A), and when not, evaluated unsatisfactory (B).

TABLE 1

|  | Condition 1 | Condition 2 | Diffraction efficiency at 400 nm | Diffraction efficiency at 500 nm | Diffraction efficiency at 700 nm | Judgment |
|---|---|---|---|---|---|---|
| Example 1 | S | S | 99.3% | 99.7% | 99.4% | A |
| Example 2 | S | S | 99.3% | 99.9% | 99.9% | A |
| Example 3 | S | S | 99.7% | 100% | 100% | A |
| Example 4 | S | S | 99.8% | 100% | 100% | A |
| Comparative Example 1 | S | NS | 97.0% | 98.3% | 95.3% | B |
| Comparative Example 2 | NS | S | 99.1% | 99.5% | 98.6% | B |
| Comparative Example 3 | S | NS | 95.0% | 98.4% | 95.4% | B |

As can be seen from Table 1, the optical materials in Examples 1 to 4 are very stable in diffraction efficiency at any wavelengths in the whole visible region from 400 nm to 700 nm as compared with the optical materials in Comparative Examples 1 to 3.

Second Embodiment

Figure 27:
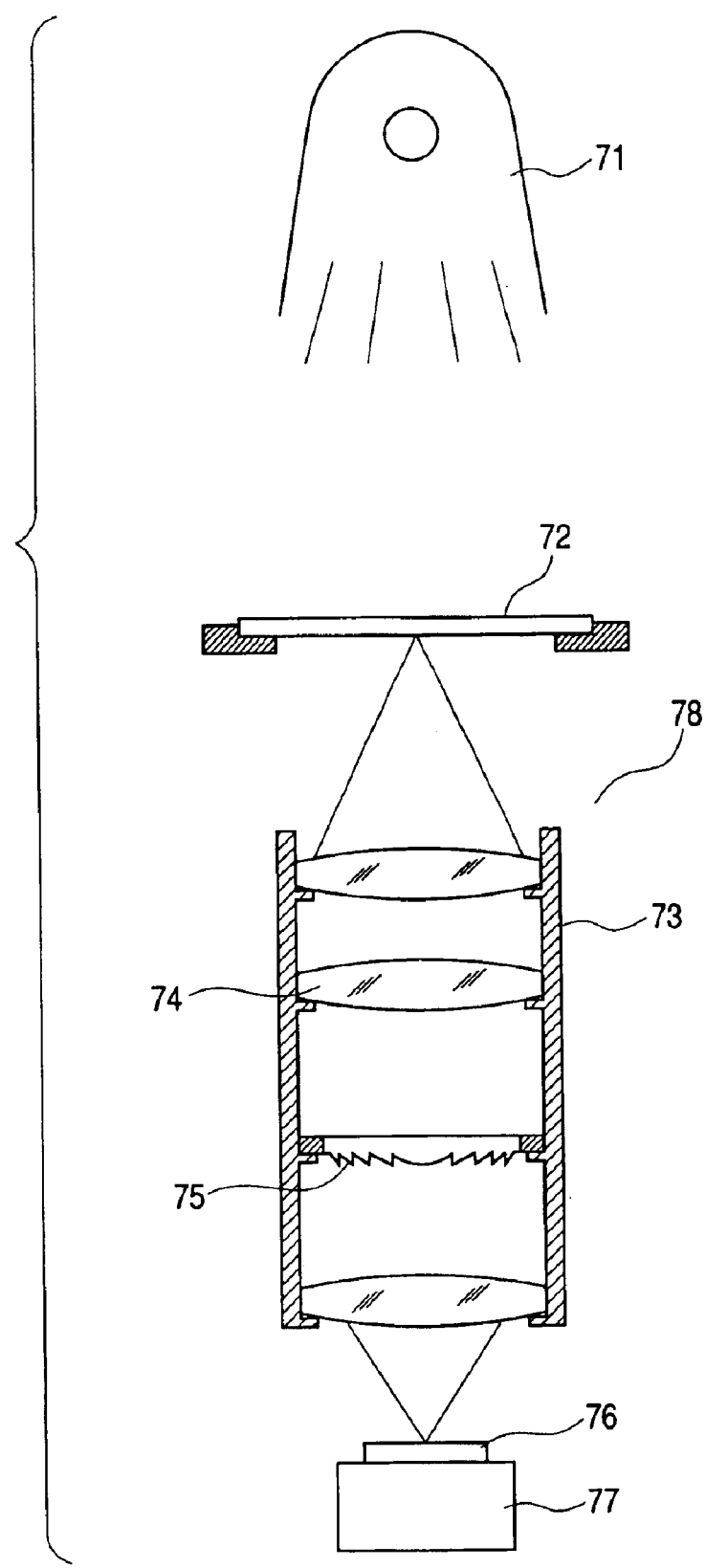
FIG. 27 is a schematic diagram of a projection optical system of the second aspect.

The second embodiment is the use of the diffractive optical element, presented in the above-described Example 1, for a projection optical system. The projection optical system is illustrated in FIG. 27. In FIG. 27, reference numeral 71 denotes a light source, 72 a reticle, 78 a projection optical system, 73 a lens barrel, 74 a lens, 75 the diffractive optical element of the present invention, 76 a wafer, and 77 a wafer stage.

The diffractive optical element 75 is arranged for the purpose of correcting the chromatic aberration of the lens 72. The wafer 76 is positioned to a desired position with the wafer stage 77, and the height of the wafer is adjusted to the focus position by use of a focus detection device not shown in the figure. In this context, the reticle is aligned with the mark already exposed on the bottom layer of the wafer, using a detection system not shown in the figure according to necessity. On completion of the focusing and alignment, a shutter (not shown) is opened to illuminate the reticle with the light from the light source 71. Thus the resist on the wafer 76 is projected with the circuit pattern of the reticle 72 and exposed by the projection optical system 78.

The wafer 76 thus exposed is subjected to the development and etching processes well known in the art to form a plurality of devices. An optical system incorporating an optical element of the present invention can also be applied in a similar manner to image forming optical instruments and illuminating devices. Additionally, the optical element of the present invention may be any desired shape other than the diffractive optical elements.

Third Embodiment

Figure 28:
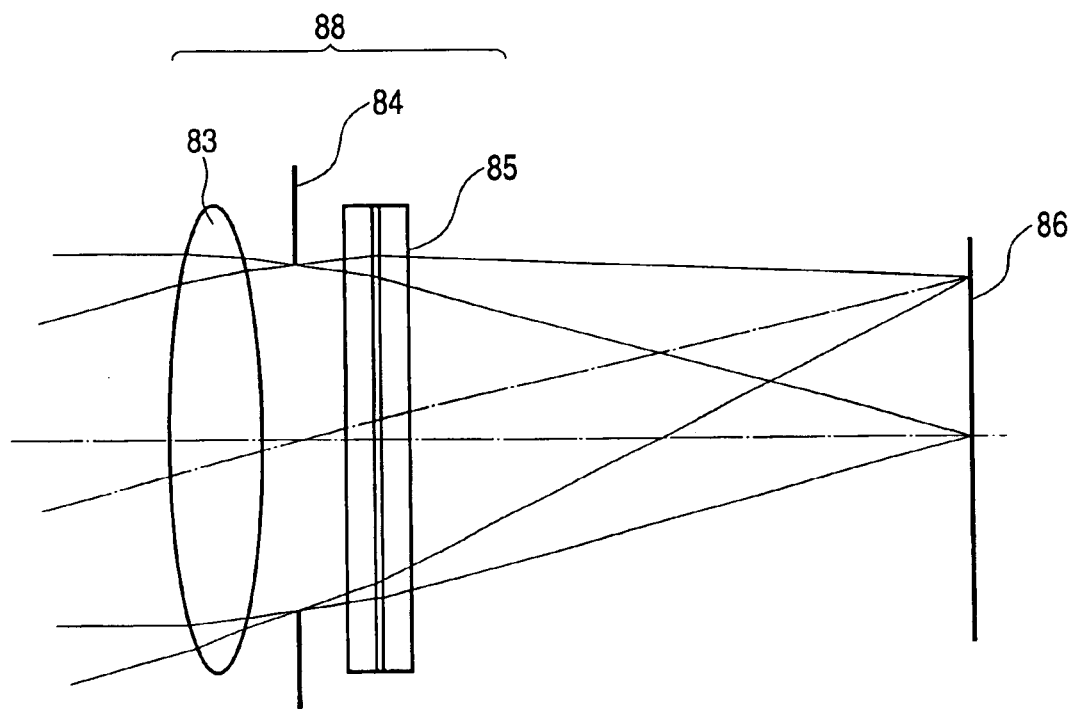
FIG. 28 is a schematic diagram of an imaging optical system of the third aspect.

The third embodiment is use of a diffractive optical element of the above first embodiment in an imaging optical system. FIG. 28 shows an imaging optical system. In FIG. 28, an imaging optical system 88 comprises at least one diffractive optical element 85, one refractive optical element 83, and one aperture diaphragm 84. FIG. 28 illustrates the way light beams from an object enter the imaging optical system 88 and form an image on a light-receiving part (an imaging device) 86.

The diffracted light of the design order from the diffractive optical element 85 is corrected for aberration so that satisfactory optical performance can be obtained in a particular wavelength region in combination with the refractive optical element 83. The light-receiving part 86 comprises a plurality of light-receiving elements having spectral sensitivities different from each other, and has a configuration in which a color image is obtained by synthesizing the images from the light-receiving elements different in spectral sensitivity. Here the light-receiving part 86 may be CCD, silver salt film, photosensitive member, and human eyes.

According to the present invention, there is provided an optical element having satisfactory diffraction efficiency over entire visible wavelength region, that is, free from partial reduction of the diffraction efficiency in any working wavelength region, by using an optical material in which the d-line refractive index ($n_d$) and Abbe number ($v_d$) are in a relation that $n_d > -6.667 \times 10^{-3} v_d + 1.70$, and, the Abbe number ($v_d$) and second order dispersion ($\theta_{g,F}$) are in a relation that $\theta_{g,F} \leq -2 \times 10^{-3} v_d + 0.59$. In other words, as long as the second order dispersion ($\theta_{g,F}$) is not higher than $-2 \times 10^{-3} v_d + 0.59$, an optical material having a refractive index as high as $n_d > -6.667 \times 10^{-3} v_d + 1.70$ can have stable diffraction efficiency, which enables production of an optical element of more precisely corrected chromatic aberration.

Additionally, by using an optical material of which Abbe number ($v_d$) is 30 or less, an optical material of high diffraction efficiency can be obtained. Further, by using an optical material of which second order dispersion ($\theta_{g,F}$) after cure is 0.45 or less mixed with an inorganic nanoparticle material, an optical material high in diffraction efficiency can be obtained. More specifically, by using an optical material comprised of polystyrene and ITO nanoparticles, especially ITO nanoparticles of 2 to 50 nm in particle size, an optical material can be provided which is high in diffraction efficiency without losing ITO characteristics by light scattering or increase of the surface quantum effect.

What is claimed is:

1. An optical material in which $n_d > -6.667 \times 10^{-3} v_d + 1.70$ and $\theta_{g,F} \leq -2 \times 10^{-3} v_d + 0.59$, where $n_d$ is a refractive index at d-line, $v_d$ is an Abbe number at the d-line and $\theta_{g,F}$ is a second order dispersion at d-line, and said Abbe number ($v_d$) is 22.7 or less.

2. The optical material according to claim 1, wherein the optical material comprises a polymer and an inorganic nanoparticle material having a second order dispersion ($\theta_{g,F}$) value of 0.45 or less.

3. An optical element comprising an optical material according to claim 1, wherein said optical element is formed in a desired shape by a curing reaction.

4. The optical element according to claim 3 in which one surface is a diffracting surface having a diffractive shape.

5. The optical element according to claim 3 in which one surface is a refracting surface having a refractive shape.

6. An optical system comprising an optical element according to claim 3 and another optical element arranged in one and the same optical path.

7. The optical system according to claim 6, wherein the system images an object.

8. The optical system according to claim 6, wherein the system projects light onto an object.

9. A laminated diffractive optical element comprising:

a first diffractive optical element having a surface formed into a diffractive shape; and a second diffractive optical element having a surface formed into a diffractive shape, wherein the first diffractive optical element is made of an optical material in which $n_d > -6.667 \times 10^{-3} v_d + 1.70$ and $\theta_{g,F} \leq -2 \times 10^{-3} v_d + 0.59$, where $n_d$ is a refractive index at d-line, $v_d$ is an Abbe number at the d-line, and $\theta_{g,F}$ is a second order dispersion at d-line;

the second diffractive optical element has an Abbe number larger than that of the first diffractive optical element; and the diffracting surface of the first optical element and the diffracting surface of the second optical element are arranged in an opposite position, and said Abbe number ($v_d$) is 22.7 or less.

10. The optical material according to claim 2, wherein the polymer is polystyrene and the inorganic nanoparticle material is a transparent nanoparticle material.

11. The optical material according to claim 10, wherein a size of the transparent nanoparticle material is from 2 to 50 nm.

12. The optical material according to claim 11, wherein the transparent nanoparticle material is an ITO nanoparticle material.

* * * * *